US006959593B2

(12) United States Patent
Mancosu et al.

(10) Patent No.: US 6,959,593 B2
(45) Date of Patent: Nov. 1, 2005

(54) SYSTEM, TIRE, WHEEL, VEHICLE, AND METHOD FOR DETERMINING THE BEHAVIOR OF A TIRE IN MOTION

(75) Inventors: Federico Mancosu, Milan (IT); Giuseppe Matrascia, Seregno (IT); Carlo Monguzzi, Monza (IT); Diego Ettore Speziari, Milan (IT)

(73) Assignee: Pirelli Pneumatici S.p.A., Milan (IT)

( * ) Notice: Subject to any disclaimer, the term of this patent is extended or adjusted under 35 U.S.C. 154(b) by 0 days.

(21) Appl. No.: 10/221,664

(22) PCT Filed: Mar. 14, 2001

(86) PCT No.: PCT/EP01/02900

§ 371 (c)(1),
(2), (4) Date: May 1, 2003

(87) PCT Pub. No.: WO01/68388

PCT Pub. Date: Sep. 20, 2001

(65) Prior Publication Data

US 2004/0064219 A1 Apr. 1, 2004

Related U.S. Application Data

(60) Provisional application No. 60/212,635, filed on Jun. 19, 2000, provisional application No. 60/219,696, filed on Jul. 21, 2000, and provisional application No. 60/222,921, filed on Aug. 4, 2000.

(30) Foreign Application Priority Data

| | | |
|---|---|---|
| Mar. 16, 2000 | (EP) | 00830198 |
| Jun. 9, 2000 | (EP) | 00830416 |
| Jul. 25, 2000 | (EP) | 00202649 |

(51) Int. Cl.$^7$ .............................................. G01M 17/02
(52) U.S. Cl. ......................................... 73/146; 340/445
(58) Field of Search ................................ 73/146, 146.2, 73/146.3, 146.4, 146.5, 146.8; 340/445, 447, 442

(56) References Cited

U.S. PATENT DOCUMENTS

| | | | | | |
|---|---|---|---|---|---|
| 5,247,831 | A | * | 9/1993 | Fioravanti | 73/178 R |
| 5,269,186 | A | * | 12/1993 | Yopp | 73/457 |
| 5,825,286 | A | | 10/1998 | Coulthard | |
| 5,913,240 | A | | 6/1999 | Drähne et al. | |
| 5,964,265 | A | | 10/1999 | Becherer | |
| 6,561,018 | B2 | * | 5/2003 | Mancosu et al. | 73/146 |
| 6,823,244 | B2 | * | 11/2004 | Breed | 701/29 |
| 2002/0166373 | A1 | * | 11/2002 | Mancosu et al. | 73/146 |
| 2003/0058118 | A1 | * | 3/2003 | Wilson | 340/679 |
| 2003/0184944 | A1 | * | 10/2003 | Hattori | 361/115 |
| 2004/0021560 | A1 | * | 2/2004 | Sasaki et al. | 340/445 |
| 2004/0021561 | A1 | * | 2/2004 | Sasaki et al. | 340/445 |

FOREIGN PATENT DOCUMENTS

| | | |
|---|---|---|
| DE | 39 37 966 A1 | 5/1991 |
| EP | 0 444 109 B1 | 3/1993 |
| EP | 0 887 211 A1 | 12/1998 |
| WO | WO 93/25400 | 12/1993 |

* cited by examiner

*Primary Examiner*—Edward Lefkowitz
*Assistant Examiner*—Andre Allen
(74) *Attorney, Agent, or Firm*—Finnegan, Henderson, Farabow, Garrett & Dunner, L.L.P.

(57) ABSTRACT

A system for determining interaction between a tire and a contact surface during movement of a motor vehicle includes at least one first sensor and processing means. The at least one first sensor includes one or more first elongated piezoelectric elements which extend along at least a first portion of the tire. The at least one first sensor supplies a first signal to the processing means. The first signal is generated by rotation of the tire and is generated cyclically with each revolution of the tire. The processing means detects variations in time intervals between distinctive elements of the first signal. A tire including the system, a kit for detecting behavior of a tire moving with respect to a contact surface, a method for monitoring events correlated with interactions between tires of a moving vehicle and a contact surface, and related systems, tires, methods, and vehicles are also disclosed.

22 Claims, 19 Drawing Sheets

SYSTEM, TIRE, WHEEL, VEHICLE, AND METHOD FOR DETERMINING THE BEHAVIOR OF A TIRE IN MOTION

CROSS-REFERENCE TO RELATED APPLICATIONS

This application is a national stage entry under 35 U.S.C. § 371 from International Application No. PCT/EP01/02900, filed Mar. 14, 2001, in the European Patent Office, the contents of which are relied upon and incorporated herein by reference; additionally, Applicants claim the right of priority under 35 U.S.C. § 119(a)–(d) based on patent application Ser. No. 00830198.8, filed Mar. 16, 2000, in the European Patent Office, patent application Ser. No. 00830416.4, filed Jun. 9, 2000, in the European Patent Office, and patent application Ser. No. 00202649.0, filed Jul. 25, 2000, in the European Patent Office; further, Applicants claim the benefit under 35 U.S.C. § 119(e) based on provisional application No. 60/212,635, filed Jun. 19, 2000, in the U.S. Patent and Trademark Office, provisional application No. 60/219,696, filed Jul. 21, 2000, in the U.S. Patent and Trademark Office, and provisional application No. 60/222,921, filed Aug. 4, 2000, in the U.S. Patent and Trademark Office.

BACKGROUND OF THE INVENTION

1. Field of the Invention

The present invention relates to a system and tyre for the continuous determination of the interaction between a tyre and the ground during the movement of a motor vehicle.

The present invention also relates to a method for the continuous determination of the behaviour of a tyre, and of the vehicle equipped with the said tyre, as it moves along the road.

More particularly, the present invention relates to methods for detecting an interaction between at least one moving tyre and a contact surface; for detecting the behaviour of at least one tyre moving with respect to a contact surface; for enabling a tyre to generate and transmit a signal descriptive of its own behaviour when moving with respect to a contact surface; for enabling a tyre mounted on a wheel rim to generate a signal descriptive of its own behaviour when moving with respect to a contact surface; for manufacturing a wheel inclusive of a tyre, rim and sensor, that is capable of generating a signal descriptive of the behaviour of the tyre when moving with respect to a contact surface; for monitoring the behaviour of a moving vehicle mounted on wheels; for controlling the behaviour of a moving vehicle mounted on wheels; for quantifying the magnitude of an event caused by an interaction between at least one moving tyre and a contact surface; for monitoring the structural uniformity of a tyre; and for detecting deflation of a tyre.

The present invention also relates to:

- a kit for detecting the behaviour of a tyre mounted on a rim and moving with respect to a contact surface,
- a vehicle wheel that includes tyre, rim and device for detecting the behaviour of the tyre moving with respect to a contact surface, and
- a vehicle that includes body, suspension, at least one wheel fitted with a tyre and optionally at least one device for controlling the behaviour of the moving vehicle.

2. Description of the Related Art

During the movement of a motor vehicle, a knowledge of the operating conditions of a tyre makes it possible to determine the actions to be taken to control and regulate the behaviour of the motor vehicle. In particular, it is useful to know the condition of skidding or absence of skidding of the tyre and the variation of the available adhesion with respect to a reference condition, in order to activate, for example, devices to prevent brake locking (antiskid or ABS devices), devices to prevent skidding in acceleration, active suspension, etc.

It is a known practice in the state of the art to use systems designed to detect the interaction between a tyre moving on a given contact surface and the surface itself in order to extract information about the behaviour of the tyre and/or about a particular condition of operation of a tyre and, more generally, about the behaviour of a vehicle fitted with this tyre.

Of these systems, one type comprises systems based on the use of sensors that supply continuous signals representing the values of particular parameters of the tyre, such as sensors of pressure, of temperature and of localized deformation.

This type includes the extensometers, that is so-called strain gage sensors, e.g. prismatic elements of a piezoelectric or magnetic polymer inserted into the tread of the tyre to detect localized deformations of the tread in the footprint.

EP-B1-0 444 109 describes a method for controlling the movement of a motor vehicle provided with tyres which interact with the ground to form corresponding footprints, comprising the steps of

- monitoring the behaviour of the footprints and generating at least one corresponding footprint signal indicating the behaviour of the footprint, and
- using at least one footprint signal to monitor the movement of the motor vehicle,
- detecting at least one driving control signal generated by the driver of the motor vehicle, and
- processing at least one driving control signal in dependence on at least one footprint signal in order to control the movement of the motor vehicle.

To detect this behaviour of the footprints, this method makes use of piezoelectric extensometers embedded in the tread strip because they have to detect the deformations in the footprint. This causes significant disadvantages both in the construction of such a tyre and in the measurement of the deformations.

This is because piezoelectric extensometers are formed from piezoresistive rubber strips, and a piezoelectric or piezoresistive rubber is not an elastomer, but a plastic material, and therefore gives rise to problems of compatibility with the rubber of the tread (because of the different moduli and different adhesion capacities) as well as problems of fastening.

The applicant has also observed that the aforesaid method detects only the deformations of the tread strip within the footprint, so that all other deformations occurring in a moving tyre are disregarded. Finally, the applicant has also observed that the deformations of the footprint cannot be correlated in a one-to-one way with the deformations of the tyre.

Similarly the prior art includes systems designed to obtain specific information on the behaviour and/or condition of the tyre, such as to describe the overall situation of the complete tyre rather than, as is typical of the aforementioned detection systems, of a localized portion of the tyre.

For example, U.S. Pat. No. 5,913,240 relates to a device capable of detecting the longitudinal force acting on a vehicle tyre caused by the torsional deformation of the tyre itself, in order to control tyre slip due to a positive or negative acceleration of the vehicle. According to this patent the determination of this longitudinal force can also be used to monitor the inflation pressure of the tyre. The device has a supporting structure integral with the vehicle's brake calliper and comprises at least one pair of sensors arranged radially in fixed positions, one on the outside and the other on the inside, i.e. at a greater and at a shorter distance from the axis of rotation of the wheel. On the side facing the vehicle the wheel is fitted with at least one pair of position marks, a radially outer mark and a radially inner mark, at different distances from the axis of rotation. The passing of these marks is detected by the said sensors which measure, in the period of time lapsing between their passage, the torsional deformation of the tyre, from which, as indicated, the longitudinal force acting on the tyre can be calculated. The signals obtained by this means are sent to a processing unit which warns the driver of the vehicle if the tyre is in a condition of slip and, optionally, also of the state of inflation of the tyre.

A different type of detection system comprises systems based on the use of sensors that supply discontinuous cyclical signals representative of particular events during the running of the tyre, such as, for example sensors that indicate when they enter and/or leave the footprint of the tyre.

EP-A1-0 887 211 describes a tyre monitoring system comprising a sensor located within the tyre and enabled to create an electrical pulse when the said sensor passes through the footprint formed by the contact of the tyre with the ground during rolling. The system of this patent application also comprises means for determining the ratio of the said electrical pulse to the duration of one revolution of the tyre and means for transmitting the said ratio to a processing unit within the vehicle.

In particular, the sensor is a deformation indicator, for example an extensometer, possibly made from piezoelectric material, located within the tyre in such a way that the said electrical pulse has a first peak at the point when the sensor enters the footprint and a second peak at the point of exit from the footprint. The sensor therefore detects the instant of entry into the footprint and the instant of exit from this area, and, according to the teaching of this patent, the ratio between the time elapsed between the two peaks and the time of a complete revolution of the tyre can be used to determine the flattening of the tyre during the movement of the vehicle. This is because, if the angular velocity of the tyre and its radius are known, it is possible to measure the length of the footprint. The length of the footprint is therefore related to the flattening of the tyre, which is a critical parameter of the tyre in operation, particularly in tyres for heavy goods vehicles.

Another type of detection system comprises systems based on the use of a sensor that supplies a cyclical and continuous signal about the behaviour of a single point of the moving tyre. This sensor is typically an accelerometer.

A plurality of the said sensors are attached to individual separate points on the tyre, and the abovementioned systems are designed to work out the behaviour of a tyre and/or of a vehicle from the description of the movement in space and time of the said points.

Each of the said sensors supplies a signal which is cyclical, in the sense that it repeats itself at each revolution of the tyre, is continuous in time and is descriptive of the movement of the single point to which the sensor is attached.

The data acquired by the abovementioned system are claimed to be useful for intervening on the motor vehicle's controls (ABS, active suspensions, etc.) and modifying its behaviour, e.g. during braking, accelerating, skidding and the like.

Patent U.S. Pat. No. 5,825,286 relates to a system and method for extracting data relating to a vehicle comprising the following steps:

- detecting parameters regarding the behaviour of the vehicle from the inside of a tyre mounted on the vehicle wheel,
- digitizing the said data inside the tyre and transmitting them out of the tyre at predetermined intervals,
- shortening these predetermined intervals if the parameters change by a predetermined percentage,
- receiving these data at a point external to the tyre,
- comparing these data with preset values for each of the said parameters,
- showing the said data, and
- activating an alarm when these data, for each of the said parameters, exceed a preset limit.

One of the sensors for detecting the said parameters is a vibration sensor which can be a piezoelectric element, of undefined type, which emits an electrical voltage signal as its impedance varies (col. 12, lines 26–29). All the sensors form part of a module fitted to each wheel. The Applicant has observed that the abovementioned method similarly requires the acquisition of information from separate points of the tyre.

SUMMARY OF THE INVENTION

The Applicant has observed that the prior-art systems exhibit intrinsic limitations which do not allow the ideal monitoring of an event relating to a moving vehicle.

To go into more detail, the Applicant has established that although the sensor of the first type, which supplies a signal descriptive of a localized deformation of the tread in the footprint, supplies a continuous signal, it does not allow significant information to be extracted on the state of mechanical stress of the complete tyre. Specifically, a comparison between the signals supplied at two successive moments does not in itself yield any useful information on the state of deformation of the complete tyre and of the vehicle's behaviour on the road.

The second type of system for detecting the interaction between the tyre and the contact surface is based on an analysis of the movements of individual points of the tyre.

The Applicant has established that not even these detection systems give a global representation of the state of mechanical stress of the complete tyre. The Applicant has in fact observed that it is important to know at every instant the global state of mechanical stress of the complete tyre in order to be able to predict the arrival (early diagnosis) of significant events (changes in the conditions of movement) concerning the tyre/road interaction or concerning the condition of the tyre. This information is also important in order to detect when the said events and/or the said condition of the tyre reach preset limits.

It has now been found that the state of interaction between a tyre and the ground can be determined with a system and a tyre comprising at least one piezoelectric sensor associated with a plurality of points forming part of any portion of the tyre, such as a predetermined circumference of the tyre.

The points of the said plurality are typically consecutive.

It has also been found that the abovementioned sensor makes it possible to monitor the structural uniformity of a tyre.

In the present description and in the claims, the term "distinctive elements" indicates peaks, rectangular waves, and the like.

Additionally, the term "elongate piezoelectric element" is used to denote a piezoelectric element whose length is at least 2 times, preferably at least 3 times, and even more preferably at least 5 times greater than its width or diameter. Preferably, the length of the said "elongate piezoelectric element" is at least 30 mm, since otherwise it would not be sufficiently sensitive to the variations of deformation undergone by any one portion of the tyre during its rotation.

The said "elongate piezoelectric element" advantageously extends for an arc of at least 90°, preferably 180° and still more preferably approximately 360°, of the circumference of the tyre.

The term "continuous" is used to denote a signal emitted by a sensor continuously throughout the cycle of revolution of the tyre even when the sensor does not extend all the way around the circumference of the tyre and when the portion of tyre to which the sensor is attached is not actually in the footprint. The said continuous signal is preferably also descriptive of the state of global stress of the tyre, that is to say of the energy associated with it during its movement in time.

The term "cyclical" is used to indicate that each distinctive element of the signal occurs on each revolution of the tyre. Their structure (the shape of particular peaks or particular waves, amplitude of particular peaks or particular waves, distance between one particular peak and another particular peak or between one particular wave and another particular wave, etc.) varies from cycle to cycle and even within the same cycle in response to changes in the mechanical stresses acting on the sensor. These mechanical stresses acting on the sensor may be due for example to the interaction between the tyre and the ground, or to expansions due to a change in the temperature of the tyre itself.

The length of the sensor determines the degree of resolution of the signal emitted. Preliminary laboratory data indicate that when the length of the sensor is sufficient to express the state of stress of the complete tyre, the value of resolution of the signal emitted is of the order of 0.05 mV.

The Applicant has also devised a method for monitoring an event relating to a vehicle moving on a given contact surface, on the basis of which, by using at least one elongate piezoelectric element attached to at least one tyre or to at least one wheel of the said vehicle, it is possible to detect a continuous and cyclical signal of the interaction between the said tyre or tyres and the said contact surface, and to process this signal in such a way as to derive a numerical value representing the magnitude of the said event.

For the purposes of this description and of the claims that follow, the term "event" is used to refer to a change in the conditions under which the vehicle is moving or to the conditions of use of at least one of its tyres. The term is intended to include, for example, changes to the conditions of the road surface (from dry to wet, or from smooth to rough), a change in the state of stress of the tyre due to acceleration/deceleration of the vehicle or to a transition from linear movement to curvilinear movement and vice versa, wear of the tyre tread (or of part of the said tread) deflation of the tyre, a variation in the efficiency of the vehicle suspension system, and the like.

The Applicant has also observed that the method according to the present invention makes it possible to extract or select from the signal, produced by the said sensor or sensors, at least one range of frequencies that are significant for a description of the predetermined event which it is wished to monitor.

In particular, the Applicant has found that:

- if a frequency analysis is performed on the signal emitted by the sensor in a defined time interval, the result is a spectrum of frequencies whose periods and amplitudes can be related to specific events in the state of movement of the tyre and/or vehicle during that interval;
- the content of the said signal in terms of frequencies contains in itself, and describes, the information relating to events that affect the tyre during the time interval under consideration;
- the information extracted as above can be associated with numerical values (indices) descriptive of the magnitude of these events.

The said indices can be used for the following purposes:

- to inform the driver of the vehicle, for example through an alarm message, that a given event has occurred or is about to occur, or
- to monitor the driver's driving style, or
- to operate control devices, in particular automatic devices, for controlling the motion of the vehicle.

In a first aspect, the invention relates to a system for the continuous determination of the interaction between a tyre and the ground during the movement of a motor vehicle, the said tyre comprising a casing, a tread, belt plies, sidewalls, beads and at least a first sensor associated for operation with processing means, characterized in that the said first sensor comprises an elongate piezoelectric element which extends along at least a first portion of the said tyre and is capable of supplying a first signal which is generated by the rotation of the said tyre and is formed cyclically on each revolution of the tyre, the said first signal having distinctive elements and the said processing means being capable of acquiring the said first signal and detecting variations of the time interval between predetermined distinctive elements of the said first signal.

In other words, in this first aspect the invention relates to a system that includes a vehicle tyre and processing means, the said tyre being associated with an elongate piezoelectric element which extends along at least a first portion of the said tyre and is capable of supplying a first continuous signal which is generated by the rotation of the said tyre and is formed cyclically on each revolution of the tyre. The said first signal has distinctive elements and the said processing means is capable of acquiring the said first signal and detecting variations of the time interval between predetermined distinctive elements of the said first signal. The said processing means are also capable of evaluating the interaction between the said tyre and the ground during the movement of the said vehicle.

The said tyre/ground interaction is indicative of the behaviour of a moving tyre and of the behaviour in motion of a vehicle equipped with the said tyre.

Preferably, the said first signal is proportional to the variations of deformation undergone by the said first piezoelectric sensor during the rotation of the said tyre.

Advantageously, the said system also comprises at least a second piezoelectric sensor associated with the said tyre, the said second piezoelectric sensor comprising an elongate piezoelectric element which extends along at least a second portion of the said tyre and is capable of supplying a second signal, generated by the rotation of the said tyre, which is formed cyclically on each revolution of the tyre, the said second signal having distinctive elements and the said processing means being capable of additionally acquiring the said second signal and detecting variations of the time interval between predetermined distinctive elements of the said first and the said second signal.

Preferably, the said second signal is also proportional to the variations of deformation undergone by the said second piezoelectric sensor during the rotation of the said tyre.

To express it in other terms, the signal generated by the said sensor is indicative of variations in the mechanical stresses experienced by a tyre during the movement of a vehicle equipped with the said tyre.

A variation in mechanical stress generated by a tyre/ground interaction is revealed by a variation in the said signal, which thus supplies information as to the behaviour of a moving tyre and as to the behaviour in motion of a vehicle equipped with the said tyre.

Given that the said tyre is mounted on a vehicle wheel rim, the said signal also includes information arising from the mass of the rim and from the relative distribution of the said mass, and the continuously generated signal is therefore representative of the movement of the entire wheel.

The present invention is based on reading and interpreting variations in distinctive elements of the signal and, in particular, depending on the type of detection required, takes account of the absolute values of the said distinctive elements or variations in distance or frequency between distinctive elements or a combination of the said quantities.

It has been found experimentally that the said variations depend mainly on the tyre/ground interaction and are not significantly affected by elements of the signal due to the rim.

In a second aspect, the invention relates to a tyre for a motor vehicle, comprising a casing, a tread, belt plies, sidewalls, beads and at least a first sensor, characterized in that the said first sensor comprises an elongate piezoelectric element which extends along at least a first portion of the said tyre and is capable of supplying a first signal which is generated by the rotation of the said tyre and is formed cyclically on each revolution of the tyre, the said first signal having distinctive elements and the variations of the time interval between predetermined distinctive elements of the said first signal being indicative of the variations of angular velocity of the said tyre.

In other words, in this second aspect the invention relates to a tyre for a motor vehicle provided with at least one first elongate piezoelectric element which extends along at least a first portion of the said tyre and is capable of supplying a first signal which is generated by the rotation of the said tyre and is formed cyclically on each revolution of the tyre. The said first signal preferably has distinctive elements. More preferably, the variations of the time interval between predetermined distinctive elements of said first signal are indicative of the variations of angular velocity of the said tyre.

The said signal is preferably indicative of an interaction of the tyre in its entirety with the ground. Depending on the method of reading, it provides information on the behaviour of a moving tyre or on the behaviour in motion of a vehicle equipped with the said tyre.

Preferably, the said first signal is proportional to the variations of deformation undergone by the said first piezoelectric sensor during the rotation of the said tyre.

In a first variant, the said first piezoelectric sensor is applied along at least one portion of a predetermined circumference of the said tyre. Preferably, it is applied along at least one portion of the equatorial circumference of the said tyre and, even more preferably, along the whole of a predetermined circumference of the said tyre. The said piezoelectric sensor can also be fastened at suitably spaced points of a circumference of the tyre.

In a second variant, the said first piezoelectric sensor is applied along a portion of a meridian profile (lying in the plane of a cross section) of the said tyre. Preferably, it is applied along a central portion of the said meridian profile, which extends on both sides of the equatorial plane.

Advantageously, the said first piezoelectric sensor is applied to an inner surface of the said casing.

Alternatively, the said first piezoelectric sensor is embedded in the said casing, in the said belt plies, in the said tread or in a bead.

In another preferred embodiment, the said first sensor is arranged, at least partly, in contact with a tyre and with a vehicle wheel rim on which the said tyre is mounted.

Still more preferably, the said sensor is housed, at least partly, between a bead seat of a vehicle wheel rim and a bead of a tyre mounted on the said rim.

Advantageously, the said tyre comprises at least a second piezoelectric sensor comprising an elongate piezoelectric element which extends along at least a second portion of the said tyre and is capable of supplying a second signal which is generated by the rotation of the said tyre and is formed cyclically on each revolution of the tyre, the said second signal having distinctive elements and the variations of the time interval between predetermined distinctive elements of the said second signal being indicative of the variations of angular velocity of the said tyre.

Preferably, the said second signal is also proportional to the variations of deformation undergone by the said second piezoelectric sensor during the rotation of the said tyre.

Advantageously, the said second piezoelectric sensor is applied along a circumference forming part of the said bead or along a bead portion of a meridian profile of the said tyre.

As is known, piezoelectricity is the potential difference that develops between two faces of certain crystals when subjected to mechanical stress. This phenomenon is known as the direct piezoelectric effect. The reverse piezoelectric effect is also known and consists of mechanical deformations that occur in crystals, which exhibit the direct piezoelectric effect, under the influence of a potential difference.

Over recent decades, thermoplastic materials (piezoelectric polymers) that are capable of reversibly developing potential differences when stressed mechanically have also been prepared and studied.

Preferably, the said piezoelectric sensor consists of a coaxial piezoelectric cable, a bipolar piezoelectric cable or a piezoelectric strip comprising an elongate piezoelectric element, for example one consisting of a piezoelectric polymer.

In a variant, the said piezoelectric sensor comprises a cable consisting of piezoelectric portions and non-piezoelectric and electrically conducting portions, connected electrically. Preferably, they follow each other in an alternating sequence.

In particular, the said piezoelectric portions and non-piezoelectric conducting portions follow each other in a zigzag (or fretted) configuration, or are aligned.

The tyre and the system according to the invention make it possible to obtain precise information at the correct time on the variations which occur in the operating conditions of the tyre, for example on any skid situation and consequently on the variation of the available adhesion.

When this information is available, it is then possible to rapidly carry out actions for regulating and optimizing the behaviour of the moving vehicle on a straight path and/or in a curved trajectory.

More particularly, the piezoelectric sensor according to the invention can be associated for operation, by means of a transmitter, with a control unit which acquires and stores the signals emitted by the said sensor, detects variations of the time interval between predetermined distinctive elements of the said signals indicative of the variations of angular velocity of the said tyre and consequently of the creep, and processes them to supply output signals indicative of the variations of the state of interaction between the tyre and the ground (road) during the movement of the motor vehicle and to control regulating devices (for example, the brakes, accelerator, differential and suspension) designed to control the behaviour of the motor vehicle.

The said output signals, which are indicative of variations in the state of interaction between the tyre and the ground (road) during the movement of the motor vehicle may also, or only, be sent, at least partly, to means capable of emitting a visual and/or acoustic signal indicative of the behaviour of the motor vehicle.

Those skilled in the art will be able to decide how to convert and transmit the signal generated by the sensor on the basis of well-known parameters.

In the course of preliminary tests carried out by the inventors it was found that a preferred method of transmitting the signal is to use a constant-frequency carrier wave which is frequency-modulated.

In more detail, a transmission antenna, connected to a transmitter mounted on the wheel emits this wave, generating around itself an electromagnetic field of constant intensity, being contingent upon the amplitude of the carrier wave, and of variable frequency in accordance with the frequency modulation of the said carrier wave. The intensity of the said field depends on the power of the transmitter and the characteristics of the antenna.

A receiver mounted on the body of the vehicle is capable of decoding the received signal by separating the intensity of the magnetic field from its frequency. The frequency variation supplies the information about the behaviour of the moving tyre. This frequency modulation is independent of the intensity of the magnetic field which, however, determines the maximum possible distance at which the signal can be transmitted and its purity: if the magnetic field is too weak relative to the distance of the receiver, reception will be confused and distorted or it may even be impossible to receive the signal. It should be noted that in the case of a v hide in which the receiver is in a fixed position and the transmitter is mounted on the wheel, the intensity of the field detected by the receiver will itself also vary with distance between the transmitter and the receiver: in particular, the value of this intensity varies sinusoidally and is preferably set within a range of values of from 1.6 to 2.2 V for reliable signal reception. This sinusoidal wave reaches its maximum when the revolution of the wheel brings the transmitter to the shortest distance from the receiver and reaches its minimum when the transmitter is at its greatest distance from the receiver. The cyclical occurrence of a predetermined point in the said sinusoid, preferably but not necessarily the maximum, may advantageously be used as a trigger.

In another aspect, the present invention relates to a kit for detecting the behaviour of a tyre when moving with respect to a contact surface, the said tyre and the said kit both being mounted on a vehicle wheel rim.

The said kit preferably includes:

a sensor comprising an elongate piezoelectric element which, when placed in contact with a portion of the said tyre, comes under mechanical stress in relation to the movement of the said tyre and emits a continuous and cyclical signal indicative of variations of the said mechanical stress, and a transmitter of the said continuous and cyclical signal.

Still more preferably the kit includes a supporting structure, a piezoelectric sensor, a transmitter and an antenna, and also, optionally, a receiver which is to be installed for example on board the vehicle and is tuned to the same frequencies as those at which the transmitter transmits.

A kit according to the present invention, in a preferred embodiment, particularly but not exclusively designed for the continuous determination of the interaction between tyre and ground during the movement of a vehicle, comprises an annular supporting structure, preferably made of an elastic, and still more preferably elastomeric, material, capable of being fitted onto the bead seat of a mounting rim for a tyre, and laid between the shoulder of the rim and the outer surface of the tyre, in particular the outer surface of the bead area of the abovementioned tyre.

The cross section of this annular structure is preferably more or less rectangular, with the shorter sides approximately parallel with the axis of rotation of the rim and the longer sides lying in planes approximately parallel with the mid-plane of the rim, corresponding approximately to the equatorial plane of the tyre.

The said longer sides constitute the intersection of the plane of the cross section of the annular structure with the axially inner and axially outer lateral surfaces of the said structure, with reference to its position on the mounting rim.

A turn of piezoelectric cable is attached to one of these lateral surfaces of the said structure, preferably the axially inner surface, designed to be in contact with the said surface of the tyre. A terminal of the said turn is closed on a first clamp of a transmitter with which the said structure is also provided.

The transmitter is preferably provided with a fastener, (not illustrated as known per se and not particularly significant for the purposes of the present invention) to fix the said transmitter to the shoulder of the rim.

The aforementioned terminal part of the turn of piezoelectric cable reaches the said first clamp of the transmitter after passing over an edge of the supporting structure, preferably the radially outer edge, or by passing through the said structure through a hole.

The transmitter is usually provided with a transmission antenna: in a first embodiment, a transmission antenna may incorporate a turn of metallic material, preferably of copper, with at least one terminal connected to a second clamp on the transmitter.

In a convenient and different embodiment, a transmission antenna may incorporate a ferrite core inside a solenoid.

The said turn of metallic material is preferably associated with the axially outer surface of the said supporting structure.

The use of the term "associated" as applied to the turn above is intended to refer to the fact that each of the said turns may be simply laid on the supporting structure, or attached at at least one point to one of the lateral surfaces of the said structure, or even attached to the said surface throughout its length, or indeed completely embedded within the said structure.

The inside diameter of the annular structure is approximately equal to the rim diameter of the mounting rim: it is preferably slightly less in order to create a small interference with the bead seat to force the annular structure to work under slight tension.

The elasticity of the supporting structure is preferably such that it is not only possible to pass it over the shoulder of the rim during fitting but also to use the abovementioned structure on rims of different rim diameters, preferably at least those with adjacent rim diameters: in other words the structure intended for use on a 14-inch rim can also be used on a 15-inch rim and so on.

The turns indicated above are preferably nonlinear, and more preferably include at least one undulating portion, so as to allow their diameter to increase without being subject to a pulling action, for use on rims of different diameters.

The height of the lateral surfaces of the supporting structure, i.e. the amplitude of the circular annulus, is preferably greater than the height of the shoulder of the mounting rim: more preferably the diameter of the turn of piezoelectric cable is less than the outside diameter of the said shoulder in order that the said turn of cable is contained between the outer surface of the tyre and the axially inner surface of the said shoulder.

The diameter of the turn of metallic material acting as an antenna is preferably greater than the outside diameter of the said shoulder in order to prevent physical contact with the latter and enhance the efficiency of transmission.

A transmitter usually also includes a power generator in order to operate. In a preferred embodiment the aforesaid kit offers a self-powered device because the electrical signal generated by the turn of piezoelectric cable also powers, preferably via a buffer battery, the power circuit of the transmitter.

The receiver receives the signal transmitted by the transmitter in the form and by the means chosen, on the basis of the knowledge of the person skilled in the art, for the intended use. In a preferred embodiment of the detection device of the said kit, this signal is used, as described earlier, for the additional purpose of providing a trigger effect on each revolution of the wheel in order to detect the rolling speed of the wheel and work out any change in this.

The supporting structure is preferably produced from a compound which, after vulcanization, exhibits a hardness, measured in Shore A degrees, of between 50 and 80; the moduli of elasticity CA1, CA3 of the said compound are preferably as follows: CA1 between 0.8 and 2 MPa; CA3 between 3 and 12 MPa.

In one particular embodiment of the abovementioned kit, for a tyre size 195/60 R15, mounted on a rim size 15"×6j, the dimensions of the cross section of the supporting structure are those specified below where the preferred ranges of values refer to rims of between 13" and 16":

- outside diameter 390 mm, preferably between 370 and 470 mm;
- inside diameter 340 mm, preferably between 320 and 420 mm;
- height of the annulus 25 mm, preferably between 20 and 30 mm;
- thickness 2.5 mm, preferably between 2 and 3 mm.

As regards the parts of the detecting and transmitting device, the characteristics are:

- mean diameter of the turn of piezoelectric cable 360 mm, preferably between 340 and 440 mm;
- turn of metallic material made of copper;
- mean diameter of the turn of metallic material 380 mm, preferably between 360 and 460 mm;
- transmitter capable of transmitting on frequencies between 430 and 450 MHz.

In still another aspect, the present invention relates to a vehicle wheel that includes tyre, rim and device for detecting the behaviour of the tyre moving with respect to a contact surface, characterized in that the said device includes a sensor that emits a continuous and cyclical signal indicative of a state of mechanical stress or of its variations with respect to a previous state.

In another aspect, the present invention relates to a vehicle that includes a body, at least one suspension, at least one wheel fitted with a tyre and at least one device for controlling the behaviour of the moving vehicle, in which the said device is activated by a signal from the said wheel or wheels or part thereof, characterized in that the said signal is emitted continuously and cyclically by at least one sensor associated with the said wheel or wheels or part thereof, and in that the said signal is indicative of a state of mechanical stress or of its variations with respect to a previous state.

In yet another aspect, the present invention relates to a method for detecting an interaction between at least on moving tyre and a contact surface by means of a signal emitted by a sensor associated with the said tyre that includes the step of causing the generation of a continuous and cyclical signal indicative of a state of mechanical stress or of its variations with respect to a previous state.

According to a variant, the present invention relates to a method for detecting the behaviour of at least one moving tyre with respect to a contact surface that includes the following steps:

- causing the generation of a continuous and cyclical signal in relation to the movement of the said tyre;
- comparing a plurality of cycles, or parts of cycles, of the said signal with each other.

In another variant, the present invention relates to a method for enabling a tyre to generate a signal indicative of its own behaviour when moving with respect to a contact surface that includes the step of fitting the said tyre with a sensor for generating a continuous and cyclical signal indicative of a state of mechanical stress or of its variations with respect to a previous state.

Yet another variant of the present invention relates to a method for enabling a tyre to transmit a signal descriptive of its own behaviour when moving with respect to a contact surface that includes the following steps:

- providing the said tyre with a sensor for generating a continuous and cyclical signal indicative of a state of mechanical stress or of its variations with respect to a previous state;
- providing the said sensor with a transmitter capable of transmitting the said continuous and cyclical signal.

In another variant, the present invention relates to a method for enabling a tyre mounted on a wheel rim to generate a signal descriptive of its own behaviour when moving with respect to a contact surface that includes the step of providing the said tyre with a sensor for generating a continuous and cyclical signal indicative of a state of mechanical stress or of its variations with respect to a previous state.

The said method preferably also includes a stage in which the said signal is transmitted to a unit capable of supplying visual or acoustic indications of at least part of the behaviour of the said tyre.

Also preferred is a stage in which the said signal is transmitted to a unit capable of activating at least one device that will regulate the said movement of the said tyre.

The present invention includes a variant relating to a method for manufacturing a wheel inclusive of a tyre, rim and sensor in such a way that it is capable of generating a signal descriptive of the behaviour of the tyre when moving with respect to a contact surface, that includes the step of assembling the said tyre, the said rim and the said sensor, to form the said wheel, in such a way that the said sensor generates a continuous and cyclical signal indicative of a state of mechanical stress or of its variations with respect to a previous state.

Yet another variant of the present invention relates to a method for monitoring the behaviour of a moving vehicle mounted on wheels that includes the following steps:

detecting a signal, which is generated continuously and cyclically by a sensor associated with at least one of the said wheels, and which is indicative of a state of mechanical stress or of its variations with respect to a previous state;

transmitting the said signal to a processing unit with which the said vehicle can be provided.

The processing unit may be positioned inside the vehicle or outside of it.

The said method preferably also includes a stage in which changes in distinctive elements of the said signal within the same cycle or compared with a previous cycle are detected in order to supply signals indicative of the behaviour of the said moving vehicle.

The said stage of detection may also relate to the signals coming from at least two tyres of the same vehicle to supply signals indicative of the comparison of changes in distinctive elements of signals coming from the said two or more tyres.

In another variant, the present invention relates to a method for controlling the behaviour of a moving vehicle mounted on wheels and comprising at least one motion control device that includes the following steps:

detecting a signal, which is generated continuously and cyclically by a sensor associated with at least one of the said wheels, the said signal being indicative of a state of mechanical stress or of its variations with respect to a previous state;

transmitting the said signal to a unit with which the said vehicle can be provided and which is capable of activating the said motion control device or devices.

Another variant of the present invention relates to a method for monitoring the structural uniformity of a tyre by analysing the rotation, at a predetermined speed, of a wheel that includes the said tyre inflated to a predetermined pressure and a mounting rim, of which both the mass and the relative distribution of the said mass are known, the said method including the following steps:

detecting a signal generated continuously and cyclically by a sensor associated with the said wheel, capable of sensing a cyclical variation of mechanical stress indicative of a variation of centrifugal force due to a nonuniformity of distribution of masses in the said wheel;

transmitting the said signal to a processing unit;

cleaning the said signal of the component due to the mounting rim;

comparing at least one distinctive element of the said signal with at least one reference value.

As is known to those skilled in the art, these structural nonuniformities can depend on features of its construction such as, for example, the presence and position of the joints and the ply steer; or from manufacturing imperfections such as, for example, uneven distribution of the masses and eccentricity of the tyre; or from wear.

For each nonuniformity a reference value, or threshold value, will be chosen and this will vary with the type of tyre depending on whether the tyre is for use on a heavy goods vehicle, a medium-performance car, a sports car etc.

If the value determined by the method of the present invention does not exceed the preset reference value, the tyre under examination will be approved. If not, it will be rejected.

This method is also very useful in assessing the characteristics of prototypes at the research and development phase.

Another variant of the present invention relates to a method for detecting deflation of a tyre by analysing the behaviour of the tyre when moving with respect to a contact surface, that includes the following steps:

detecting a signal generated continuously and cyclically by a sensor associated with a wheel that includes the said tyre, the said signal being indicative of a state of mechanical stress or of its variations with respect to a previous state;

transmitting the said signal to a processing unit;

comparing at least one distinctive element of the said signal with at least one predetermined reference value;

indicating when the value found in this way departs from the said reference value.

The said reference value is preferably a maximum threshold value and can easily be determined by the person skilled in the art on the basis of the ideal operating pressure for the type of tyre under examination.

BRIEF DESCRIPTION OF THE DRAWINGS

Characteristics and advantages of the invention will now be explained with reference to a number of embodiments shown as examples, without restrictive intent, in the attached figures, in which.

DETAILED DESCRIPTION OF THE PREFERRED EMBODIMENTS

Figure 1:
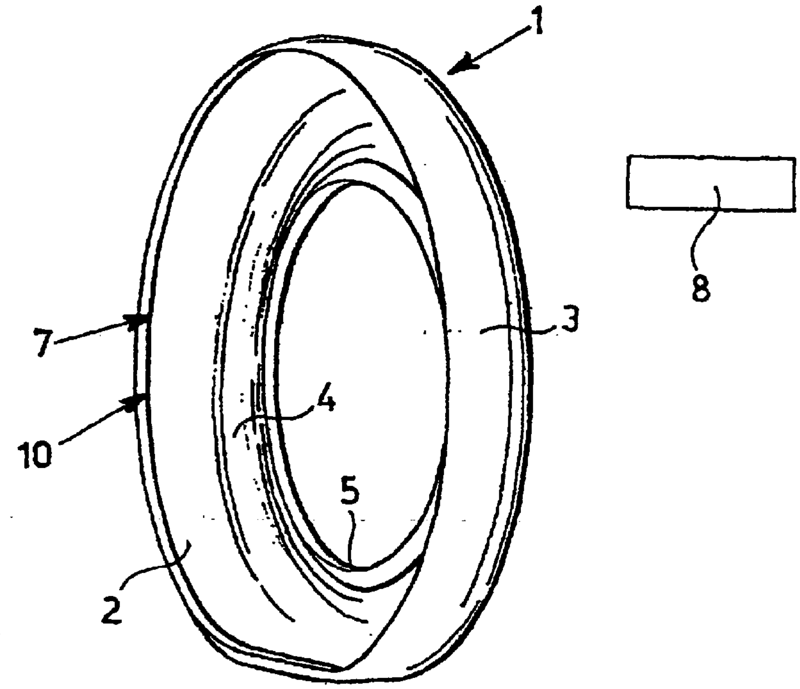
FIG. 1 shows a first embodiment of the system according to the invention for the continuous determination of the interaction between a tyre and the ground; the tyre is shown in perspective and cut in half along an equatorial plane.
Figure 2:
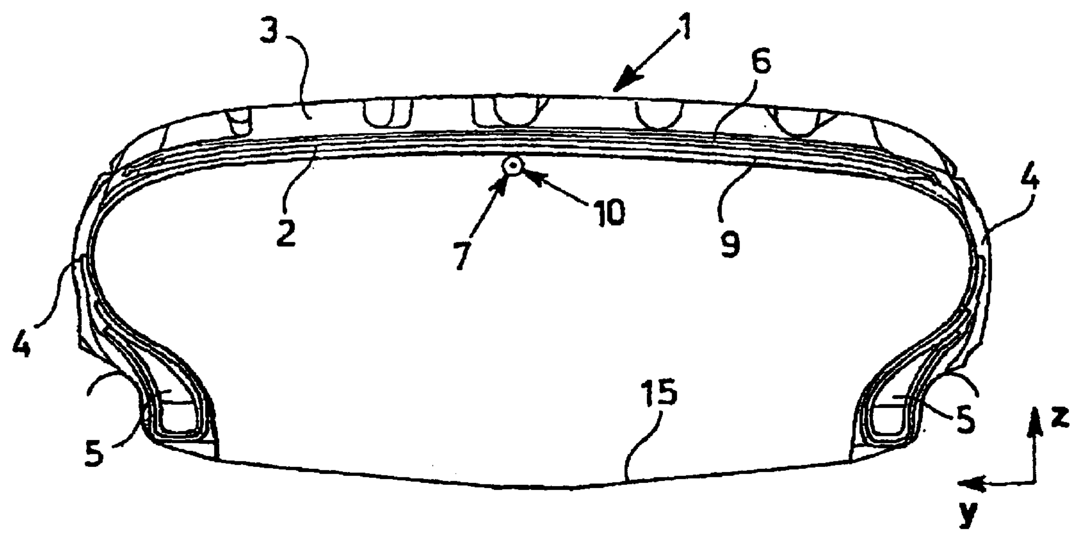
FIG. 2 is a cross-sectional view of the tyre of FIG. 1.

FIGS. 1 and 2 show a tyre 1 for a motor vehicle, comprising a casing 2, a tread 3, belt plies (belt package) 6, sidewalls 4 and beads 5. The tyre 1 is applied to a rim 15. The casing 2 has an inner surface 9 which may be covered by a coating layer (liner). The tyre 1 is associated, according to the invention, with an elongate piezoelectric element 7 formed by a piezoelectric cable 10. The piezoelectric cable 10 is applied to the inner surface 9 of the casing 2 and extends longitudinally (in the direction X, orthogonal to the plane YZ), in the direction of advance of the motor vehicle, along the whole of the equatorial circumference of the inner surface of the casing. Results of the same type are obtained when the piezoelectric cable 10 extends only along a portion of the equatorial circumference (an arc of the circumference).

In more general terms the piezoelectric sensor includes an elongate piezoelectric element that defines a first surface and a second surface, each of these surfaces being in electrical contact with a conductor.

This piezoelectric element is preferably tubular in form with an inside surface and an outside surface. The electrical conductor in contact with the outside surface of the said elongate piezoelectric element is preferably a sock of electrically conducting material placed around the said surface.

The electrical conductor in contact with the inside surface of this elongate piezoelectric element is preferably in the form of a wire or cord of wires of a conducting material. In an alternative form it takes the form of a sock wound around a non-conducting support.

Figure 3:
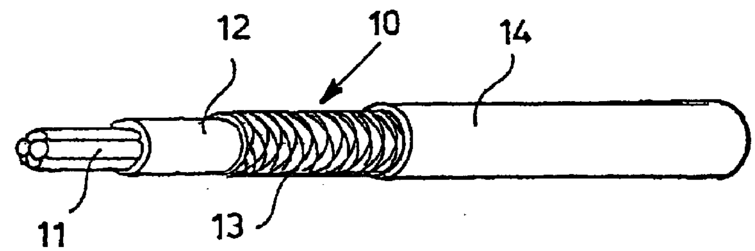
FIG. 3 is a partial perspective view, on an enlarged scale, of a piezoelectric sensor associated with the tyre of FIG. 1.

As shown in FIG. 3, the piezoelectric cable 10 comprises a central core 11, made from electrically conducting material, an insulating layer 12 and a mesh wrapping 13, also made from electrically conducting material. The core 11 is formed, for example, from a cord of tinned steel wires, while the wrapping 13 is made from copper. The insulating layer 12 is interposed between the core 11 and the wrapping 13, and is formed from a piezoelectric polymer such as polyvinylidene fluoride (PVDF). An outer covering and protecting sheath 14, made from elastoplastic material, for example polythene or butyl halogen rubber, is applied to the wrapping 13. The piezoelectric cable 10 has, for example, a diameter of approximately 3 mm.

When the cable is embedded in the tyre, for example in the casing 2, in the belt plies 6, in the tread 3 or in the bead 4, it is preferred to use a piezoelectric cable 10 without the outer sheath 14 in order to avoid problems of incompatibility between the material of this outer sheath 14 and the materials of which the tyre is made.

The Applicant has found that this solution can advantageously be adopted even when the cable is arranged on an internal or external surface portion of the tyre.

In the tyre 1, the piezoelectric cable 10 is applied to the inner surface 9 of the casing 2. However, similar results will be achieved by embedding the piezoelectric cable 10 in the casing 2, where it can replace a cord of the casing ply 2; in the belt 6, where it can replace a cord of a belt ply; in the tread 3; or in a bead 5. Additionally, the piezoelectric cable 10 can be applied within a circumferential groove of the tread 3, preferably at the bottom of a channel, or on a sidewall 4.

When the piezoelectric sensor 7 formed by the piezoelectric cable 10 is subjected to deformation, it generates electrical charges which produce a potential difference which is proportional, preferably in a linear way, to the variation of the deformation undergone.

In a different type of cable the potential difference generated may vary in a nonlinear manner as the deformation of the piezoelectric sensor varies.

As is known, electrical charges are generated whenever the piezoelectric cable is subjected to mechanical stress, in particular to a variation of the state of its current mechanical stress, such as, for example, when it comes under alternately varying pressures or repeated flexings.

During the movement of the vehicle, the piezoelectric sensor 7 undergoes deformations which produce electrical signals such as those shown in FIGS. 4–6, 9–10, 13, 14 and 19, 20. The said signals are characterized by distinctive elements consisting of peaks, rectangular waves and the like.

The applicant has found that these distinctive elements are generated by the interaction with the road of nonuniformities in the tyre (e.g. tread blocks, joins between the fabrics bonded into the casing structure of the tyre, uneven distribution of masses, etc.) which, being localized around the circumference of the tyre, cause cyclical variations in the state of mechanical stress of the rotating tyre. The cyclical variations are related to the movement (speed of rotation and skids) of the wheel.

In an alternative embodiment of the invention a nonuniformity is deliberately applied to a tyre in order to generate a particular distinctive element in the signal emitted by a sensor.

In particular the sensor itself may be the nonuniformity that generates the said distinctive element.

To put it another way, the applicant has found that these nonuniformities influence the waveform (amplitude of peaks and/or interval between peaks) of the signal emitted during the rotation of the tyre. This waveform, in the absence of events tending to disturb the rotation of the tyre at a constant speed, is repeated virtually identically with itself on each revolution of the wheel.

It thus becomes extremely simple to assess experimentally the impact which each event, studied on its own, produces on the said waveform. Turning to ever more complex situations characterized by the simultaneous presence of multiple events, it is no less easy to recognize the presence of each individual event. These complex situations can be reproduced experimentally beginning with a wheel allowed to rotate freely on the bench and progressively moving to the same wheel rotating on a roadwheel (a laboratory device which is well known per se) that is smooth, rough, has obstacles, and suitably selected angles of camber and of drift, leading ultimately to a wheel mounted on a vehicle.

The basis for this is that each event constitutes a perturbation that modifies the said waveform. If the perturbation produced by each event, even in complex situations, is known, it is possible to recognize each individual event by comparing the waveform of an individual signal, at a precise instant, with the corresponding waveform (stored in memory) of the said signal at another moment, for example in a previous cycle of rotation.

The present invention therefore successfully interprets complex situations on the basis of knowing all the elementary situations of which they are composed. To this end, according to the invention, it is sufficient to use a single type of sensor and analyse a single signal. In contrast, the methods of the prior art, which study complex situations characterized by the simultaneous presence of multiple events, begin with the said complex situations and attempt to tease out the elementary situations of which they are made up by analysing a plurality of signals each generated by a different type of sensor specific to each event which they are wished to monitor (that is each elementary situation).

The electrical signals, proportional to the variations of deformation, which are emitted by the piezoelectric sensor 7 are converted, by means of a transmitter (not shown), into analog or digital signals which can be transmitted over a distance, in the form of radio signals, for example.

The piezoelectric sensor 7 is associated for operation, by means of the aforesaid transmitter, with a control unit 8 (FIG. 1) which acquires and stores the signals emitted by the sensor 7 and detects variations of the time interval between predetermined distinctive elements of the said signals indicating the variations of angular velocity of the said tyre 1, and therefore of the creep. The control unit processes them and supplies output signals indicative of the variations of the state of interaction (skidding) between the tyre 1 and the ground (road) during the movement of the motor vehicle. The output signals are used to operate regulating devices designed for the control of the behaviour of the vehicle, such as the brakes, accelerator, differential and suspension.

Figure 4:
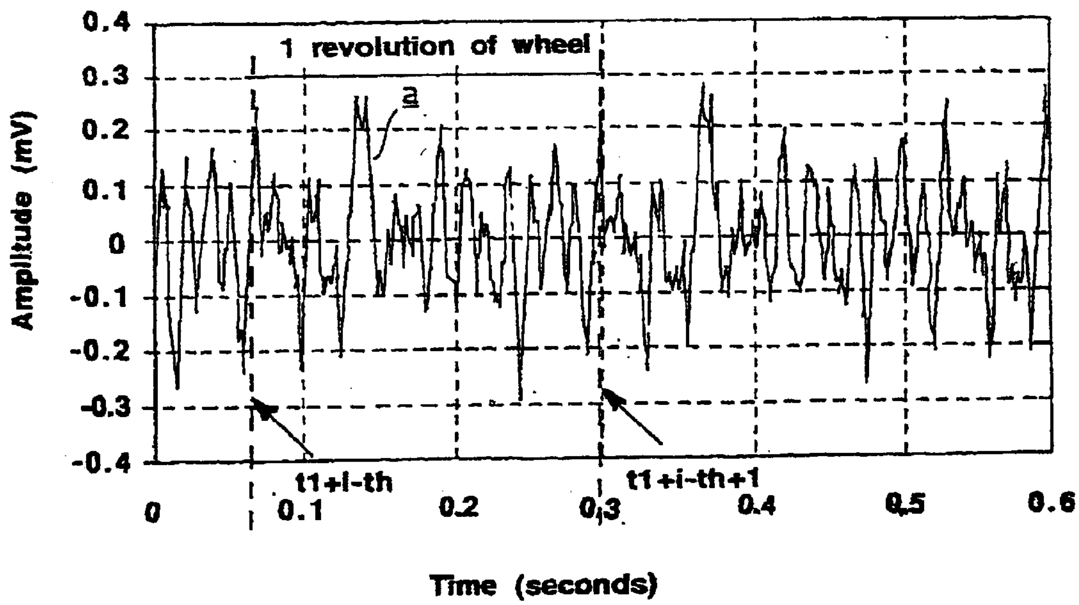
FIGS. 4, 5 and 6 are graphs which show a signal emitted by the piezoelectric sensor associated with the tyre of FIG. 1.
Figure 5:
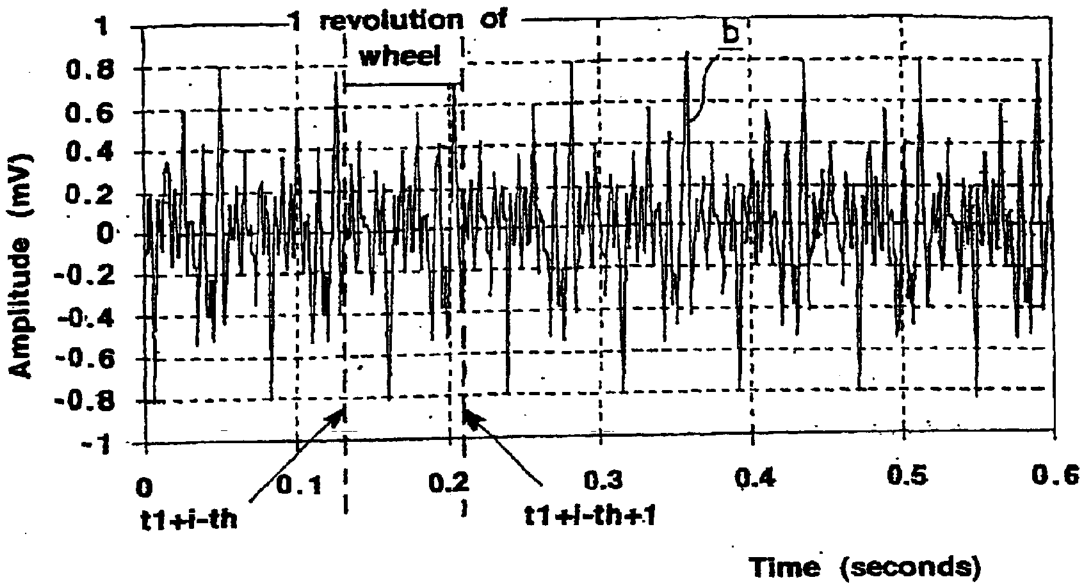
Figure 6:
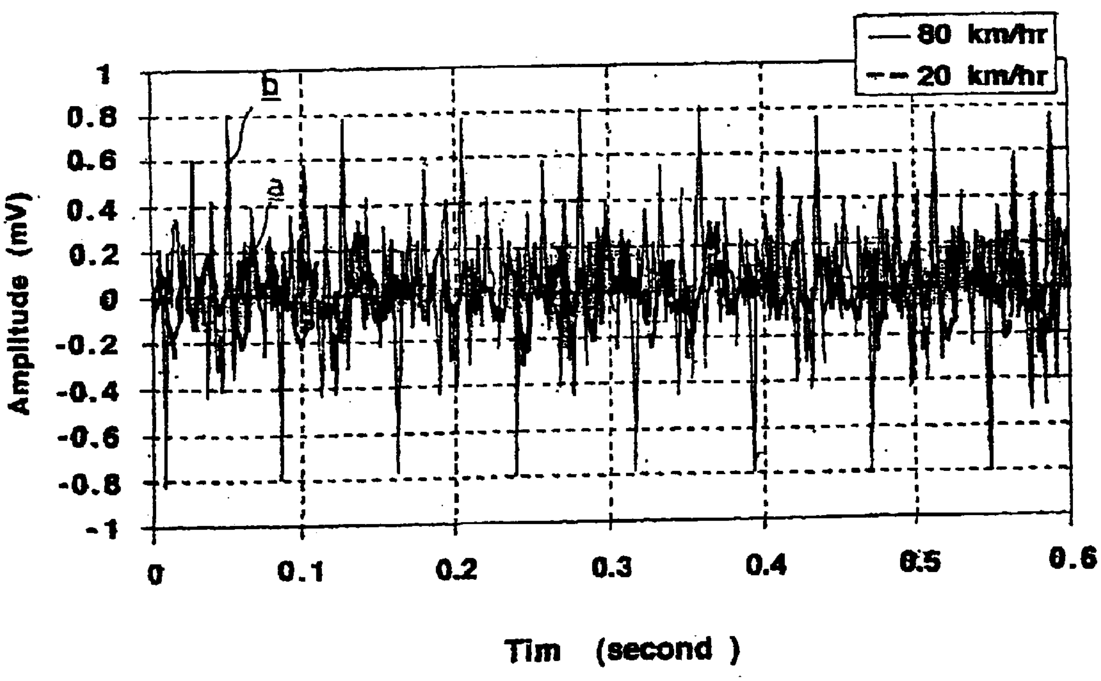

Examples of signals emitted by the piezoelectric sensor 7 are shown in the graphs of FIGS. 4, 5 and 6 for a tyre of the 195/65 R15 size, with a 6J rim, at an inflation pressure of 2.2 bar, subjected to a vertical load of 350 kg, at constant velocity along a straight path.

The graph in FIG. 4 shows the variation of the amplitude (millivolts) of the signal a emitted by the piezoelectric cable over a period of time (seconds) in each cycle of revolution of the tyre, in straight motion, on a smooth road, at a constant velocity of 20 km/hr.

The graph in FIG. 5 shows the variation of the amplitude (millivolts) of the signal b emitted by the piezoelectric cable over a period of time (seconds) in each cycle of revolution of the tyre, in straight motion, on a smooth road, at a constant velocity of 80 km/hr.

The graph in FIG. 6 shows the signal a compared with the signal b. This comparison shows that it is possible, at any rotation speed, to distinguish very precise peaks (distinctive elements) in each revolution of the tyre which can be considered equivalent to those emitted by the teeth of a phonic wheel. When the tyre rotates at constant velocity, these peaks are at fixed intervals, whereas, in braking, the said peaks tend to move apart and the variations in the time interval between the said peaks are indicative of the variations of angular velocity of the tyre and therefore of the corresponding creep.

Figure 7:
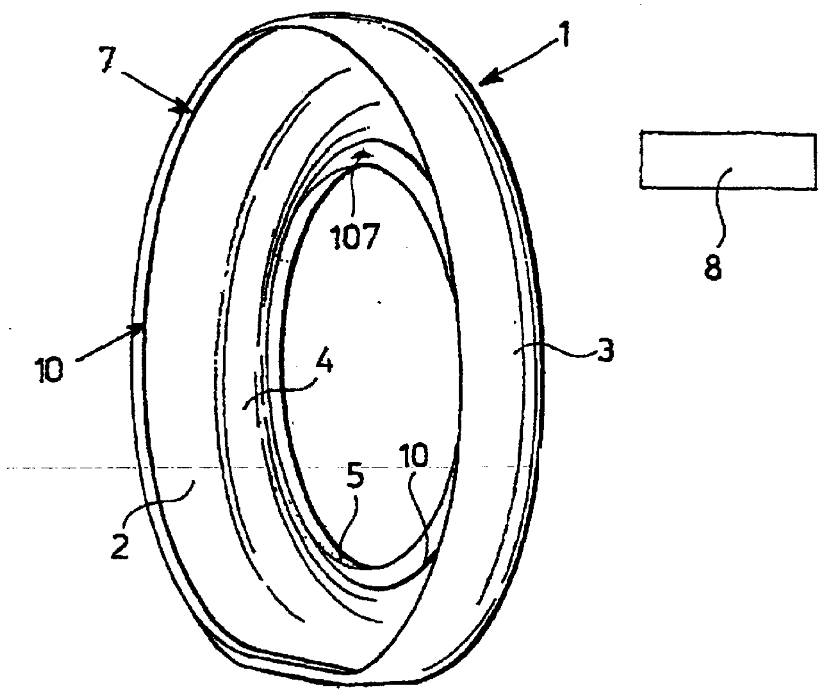
FIG. 7 shows a second embodiment of the system according to the invention for the continuous determination of the interaction between a tyre and the ground.
Figure 8:
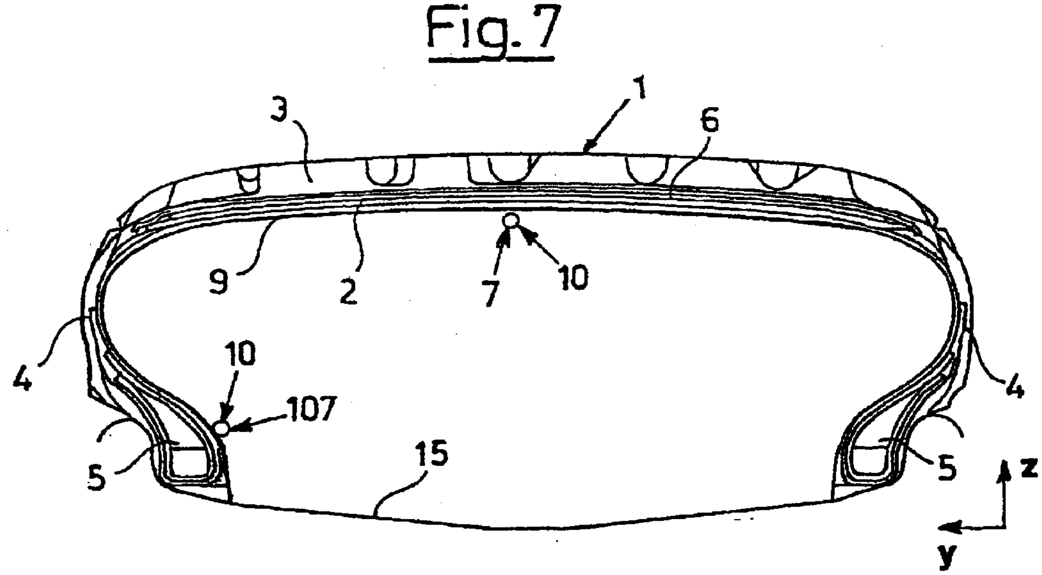
FIG. 8 is a cross-sectional view of the tyre of FIG. 7.

FIGS. 7 and 8 show a variant of the system according to the invention, in which the tyre 1 is associated with the piezoelectric sensor 7 and a piezoelectric sensor 107. The piezoelectric sensor 107 is formed by a piezoelectric cable 10 (FIG. 3) applied to the inner surface 9 near a bead 5 of the tyre 1. The piezoelectric cable 10 extends along the whole circumference of the bead identified by the intersection of the bead with a plane parallel to the equatorial plane of the tyre. Results of the same type can be achieved when the sensor 107 is applied along only a portion of the said circumference or is embedded in a bead 5.

Figure 9:
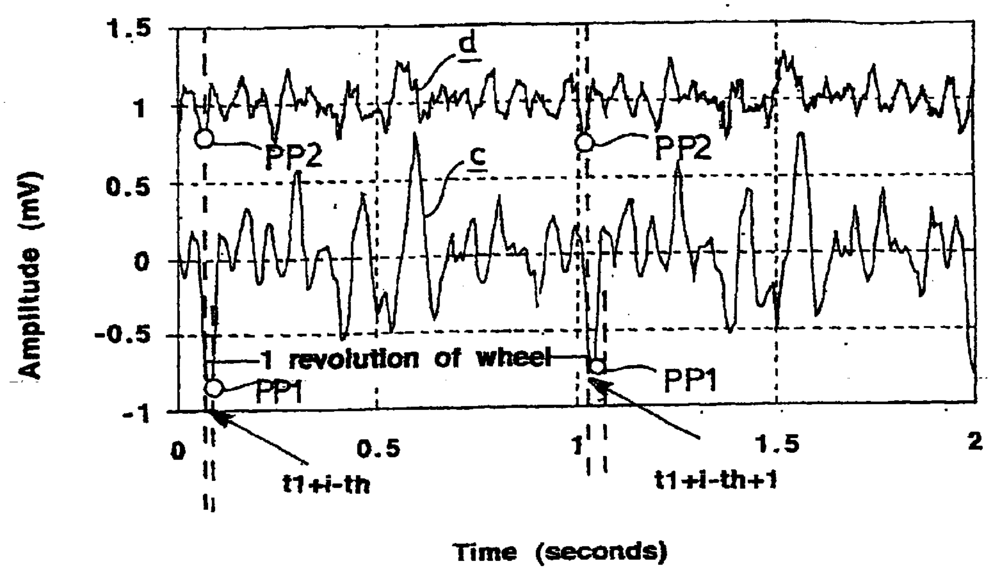
FIGS. 9 and 10 are graphs which show signals emitted by the piezoelectric sensors associated with the tyre of FIG. 7.
Figure 10:
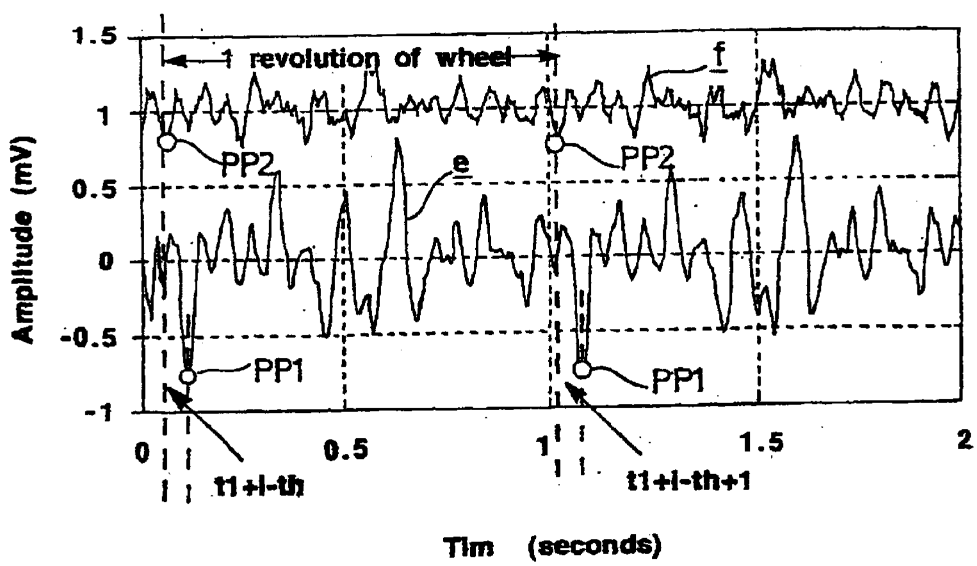

Examples of signals emitted by the piezoelectric sensors 7 and 107 are shown in the graphs in FIGS. 9 and 10 for a tyre of the 195/65 R15-P6000 size, with an inflation pressure of 2.2 bar, subjected to a vertical load of 280 kg, in straight motion, at a constant velocity of 80 km/hr.

The graph in FIG. 9 shows the variation of the amplitude (millivolts) of the signals c and d emitted, respectively, by the piezoelectric sensor 7 and by the piezoelectric sensor 107 over a period of time (seconds) in each cycle of revolution of the tyre, in the absence of torque (rotation at constant velocity). The signals c and d are synchronous. FIG. 9 shows the distinctive elements (homologous peaks) PP1 and PP2 of the signal c and of the signal d respectively.

The homologous peaks relate to the same "non-uniformity" of the tyre, consisting of a non-uniform distribution of mass, such as the individual pitches of the tread pattern or the means of fixing the piezoelectric cable to the tyre.

Within each revolution of the tyre, the time interval between the homologous peaks PP1 and PP2 is measured. This interval indicates the phase displacement between the signal generated by the "non-uniformity" in the piezoelectric sensor 7 and that generated in the piezoelectric sensor 107. The variations of the phase displacement between homologous peaks within each revolution of the tyre measure the creep to which the belt plies 6 are subjected with respect to the beads 5, and, consequently, with respect to the hub 15 on which the tyre 1 is fitted.

In the case of FIG. 9, the phase displacement between the peaks PP1 and PP2 measured at constant velocity forms the reference term for the variations of phase displacement which occur in other operating conditions of the tyre (braking, acceleration and the like).

The graph in FIG. 10 is similar to that in FIG. 9, and shows the variation of the amplitude (millivolts) of the signals e and f emitted, respectively, by the piezoelectric sensor 7 and the piezoelectric sensor 107 in a period of time (seconds) in each cycle of revolution of the tyre, in the presence of torque. In this case, a phase displacement measured between the peaks PP1 and PP2 has a different value from that measured in the condition of constant velocity (FIG. 9). Consequently, the value of the phase displacement forms a measurement of the creep to which the belt plies 6 are subjected with respect to the beads 5. Any variation of the time value of two phase displacements, measured in the i-th cycle and in the i-th +1 cycle, indicates the variation of the creep between the belt plies 9 and the beads 5 of the tyre in the operating conditions of the two successive cycles.

Figure 11:
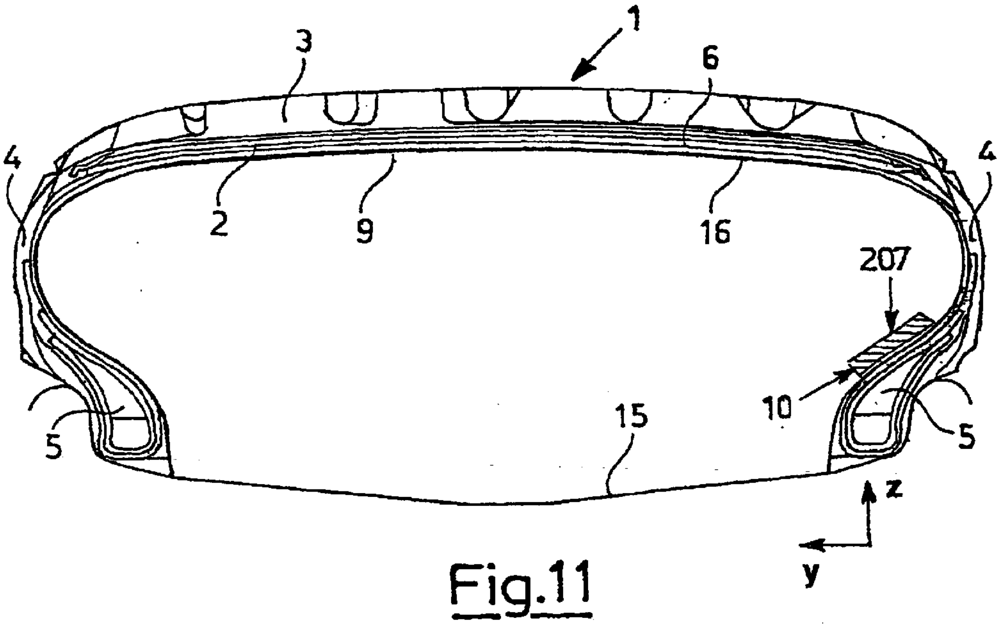
FIG. 11 is a cross-sectional view of a tyre which is associated with a piezoelectric sensor which is a variant of that of FIGS. 1 and 2.

FIG. 11 shows a piezoelectric sensor 207 associated with the tyre 1: The piezoelectric sensor 207 is formed by a piece of piezoelectric cable 10, having a length of approximately 40 mm, applied to a bead 5. The piezoelectric sensor 207 extends transversely (in the direction Y) along a bead portion of a meridian profile 16 of the tyre 1.

Figure 12:
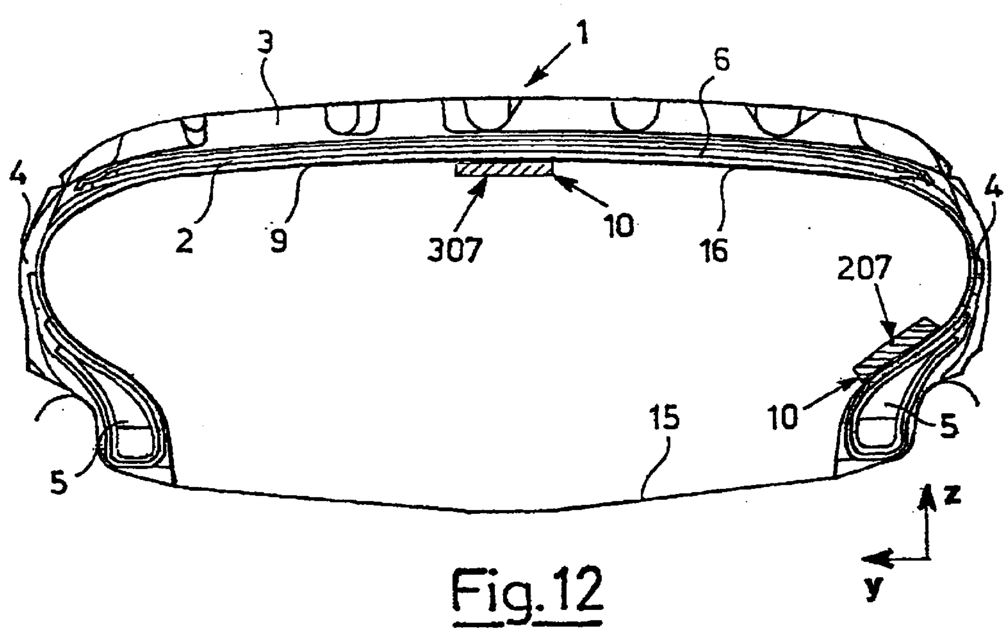
FIG. 12 is a cross-sectional view of a tyre which is associated with piezoelectric sensors which are variants of those of FIGS. 7 and 8.

FIG. 12 shows a piezoelectric sensor 307 and the piezoelectric sensor 207 associated with the tyre 1. The piezoelectric sensor 307 is formed by a piece of piezoelectric cable 10, having a length of approximately 40 mm, applied to the inner surface 9 of the casing 2. The piezoelectric sensor 307 extends transversely (in the direction Y) along a central portion of the meridian profile 16, which extends on both sides of the equatorial plane of the tyre 1.

Figure 13:
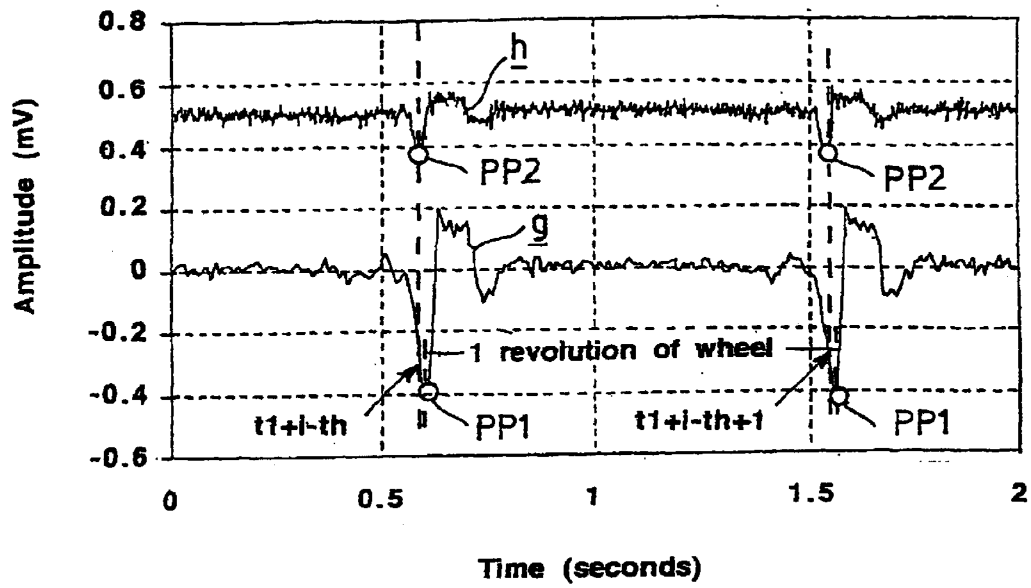
FIGS. 13 and 14 are graphs which show signals emitted by the piezoelectric sensors associated with the tyre of FIG. 12.

The graph in FIG. 13 shows the variation of the amplitude (millivolts) of the signals g and h emitted, respectively, by the piezoelectric sensor 307 and by the piezoelectric sensor 207 in a period of time (seconds) in each cycle of revolution of the tyre, in the absence of torque (constant velocity).

Figure 14:
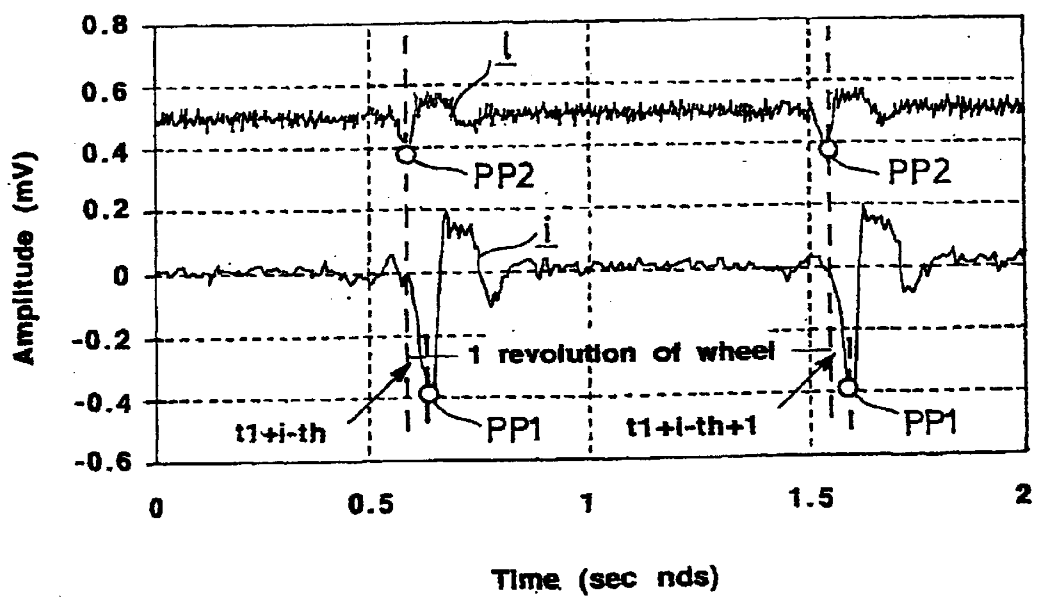

The graph in FIG. 14 shows the variation of the amplitude (millivolts) of the signals I and I emitted, respectively, by the piezoelectric sensor 307 and by the piezoelectric sensor 207 in a period of time (seconds) in each cycle of revolution of the tyre, in the presence of torque. In this case also, the phase displacement between the peaks PP1 and PP2 has a value different from that measured in the condition of constant velocity (FIG. 13).

Figure 15:
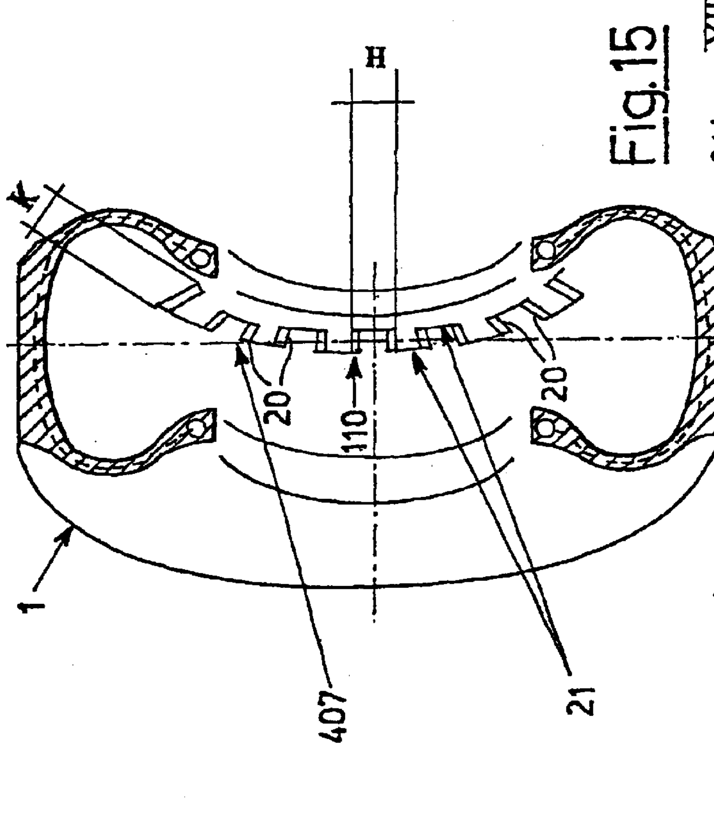
FIG. 15 shows a tyre which is associated with a piezoelectric sensor which is a variant of those of the preceding figures.

FIG. 15 shows a piezoelectric sensor 407 comprising a cable 110 which extends in a circumferential direction on the inner surface of a bead 5 of the tyre 1 with a fretted (zigzag) configuration. The cable 110 consists of an alternating sequence of piezoelectric portions 20 and non-piezoelectric, but electrically conducting, portions 21, all being connected electrically to each other. In practice, the cable 110 is formed by a set of portions 20 of piezoelectric cable connected in series with each other through the portions 21 which provide electrical continuity between the individual portions of piezoelectric cable.

More specifically, the said piezoelectric portions 20 each comprise an elongate piezoelectric element.

The beginning and the end of the cable 110 are connected to a device, for example a transmitter, which transmits the signal emitted by the cable in operation to the controller 8.

Typically, the zigzag cable has the following characteristics and dimensions:

| | |
|---|---|
| Diameter of cable: | 3 mm |
| Number of piezoelectric portions (20): | 10 (length K = 45 mm each); |
| Number of non-piezoelectric portions (21): | 10 (length H = 140 mm each). |

As can be seen in FIG. 15, the portions 21 without piezoelectric material are placed in the longitudinal direction (the direction of the forward movement of the tyre), while the piezoelectric portions 20 are placed in directions perpendicular to the other portions. The total length of the cable 110 is 1850 mm, and its longitudinal extension is 1400 mm. This cable is indicated for a tyre of the 195/65 R15 size.

The piezoelectric portions 20 can all have the same length, and the non-piezoelectric (purely conducting) portions 21 can all have the same length, which is different from that of the piezoelectric portions 20. However, it is possible to have variants in which all the portions have the same length or, conversely, in which each portion has a length different from that of the other portions, or various combinations of these.

The piezoelectric cable 110 has a structure and a configuration (alternation of piezoelectric and non-piezoelectric portions) such that it automatically generates a sequence of distinctive elements during the rotation of the tyre, independently of the non-uniformities of the tyre or of the way in which the cable is fixed to the inner surface of the tyre.

As in the embodiments described above, the cable 110, structured and configured in this way, transmits (by means of the electrical signal generated by the cable) the information on the movement of the cable during the cyclical rotation of the tyre. In the case of the cable 110, the movement of the cable, or rather of its different piezoelectric portions 20, generates an electrical signal indicative of the velocity of rotation of the tyre 1. If the measurement of the velocity of rotation of the tyre in the i-th cycle is then compared with that found in the i-th+1 cycle, it is possible to immediately determine the extent of any skidding.

Additionally, stages of skidding can be distinguished within an individual cycle of revolution of the tyre, by comparing the individual distinctive elements (peaks).

The advantage of a cable of this type lies in the fact that the signal emitted is essentially free from disturbances or background noise.

The "zigzag" configuration is also particularly convenient for a cable having piezoelectric properties along the whole of its length.

Figure 16:
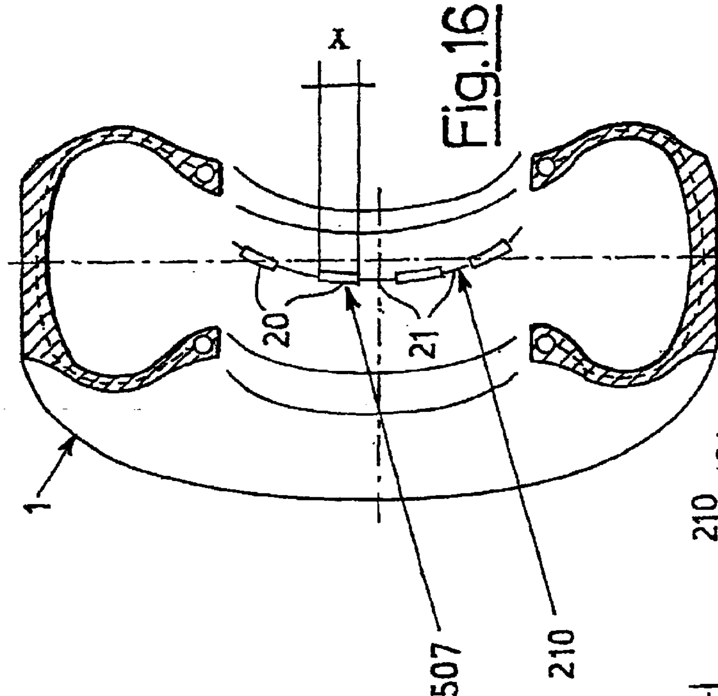
FIG. 16 shows a tyre which is associated with a piezoelectric sensor which is a variant of that of FIG. 15.

FIG. 16 shows a piezoelectric sensor 507 comprising a cable 210 consisting of piezoelectric portions 20 and non-piezoelectric conducting portions 21 placed in an alternating sequence and aligned along the same circumference.

In particular, the said piezoelectric portions comprise at least one elongate piezoelectric element.

It is also possible to place a cable, such as the cable 210, along at least one portion of the meridian profile, in other words one lying in the same plane as a cross section of the tyre.

The signals emitted by the piezoelectric sensors 407 and 507 are similar to those of the sensors illustrated above.

Figure 18:
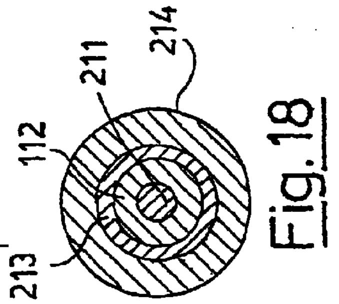
FIG. 18 is a sectional view through the plane XVIII—XVIII in FIG. 17.
Figure 17:
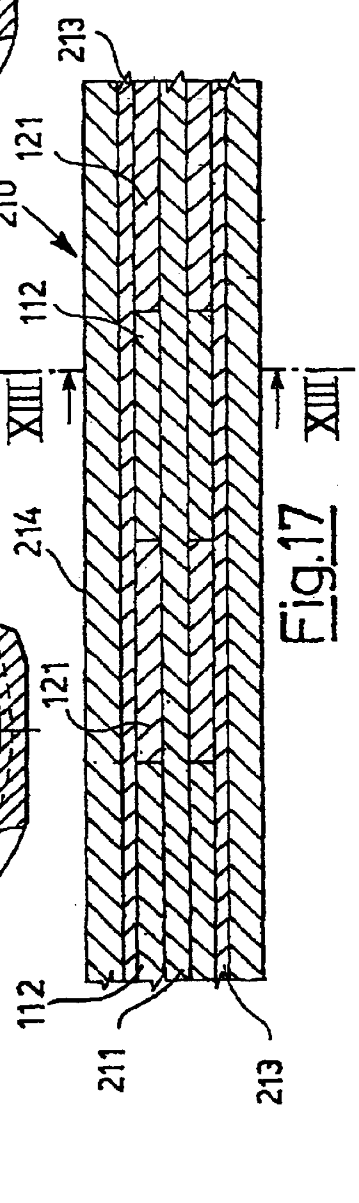
FIG. 17 is a view in longitudinal section of an embodiment of the piezoelectric sensor of FIG. 16.

FIGS. 17 and 18 show a particular embodiment of the piezoelectric cable 210. Tubular portions 112 of insulating piezoelectric material and tubular portions 121 of non-piezoelectric, but simply insulating, material follow each other in a longitudinally alternating arrangement around a central conducting core 211.

An electrically conducting mesh 213 is wrapped around the portions 112 and 121 and, in turn, a sheath 214 for covering and protecting the cable is wrapped around the conducting mesh 213.

This type of cable can be made by passing a cable, having a layer of electrically insulating polymer capable of developing piezoelectric properties when exposed to a suitable electromagnetic field, through an alternately activated and inactivated electromagnetic field, with a continuous uniform motion.

Figure 19:
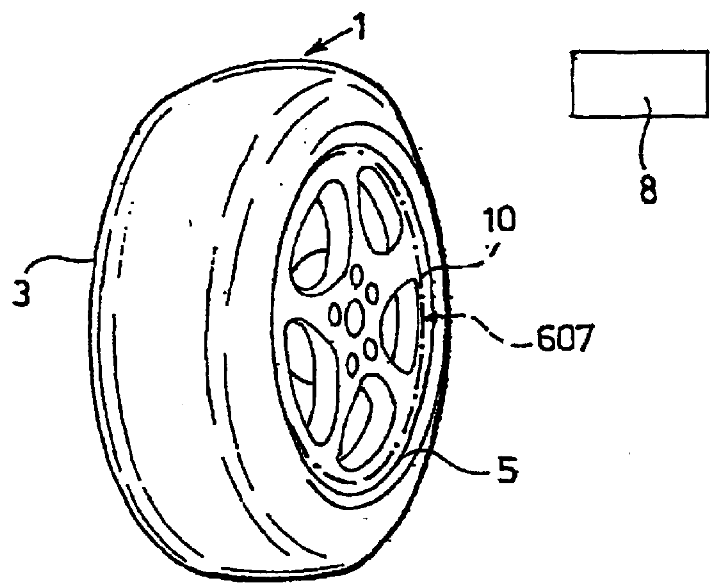
FIG. 19 shows a variant of the system according to the invention for the continuous determination of the interaction between a tyre and the ground.
Figure 20:
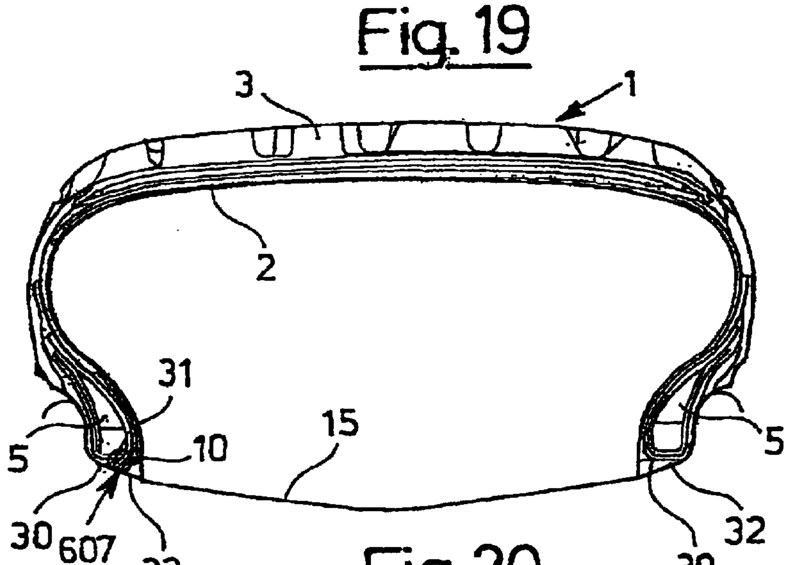
FIG. 20 is a cross-sectional view, on a larger scale, of the tyre of FIG. 19.

FIGS. 19 and 20 show a piezoelectric sensor 607 comprising a piezoelectric cable 10 (FIG. 3) fitted to the bead 5 of the tyre 1, in a base 30 thereof. The piezoelectric cable 10 extends all the way around the peripheral circumference of the base 30, or only around part of it, and is preferably housed in an annular groove 31 recessed into the bead 5; or alternatively, the abovementioned piezoelectric cable can be housed in an annular groove (not shown) recessed into a base 32 of the rim 15.

In a variant, the piezoelectric cable 10 can be embedded in a strip of compound that is to be applied along the peripheral circumference of the base 30. In this version, th annular groove for the strip of compound can be recessed either into the base 30 of the bead 5 or into the base 32 of the rim 15, or indeed into both bases.

Similar results can be obtained when the cable 10 is fitted along only a portion of the peripheral circumference of the base 30.

Figure 21:
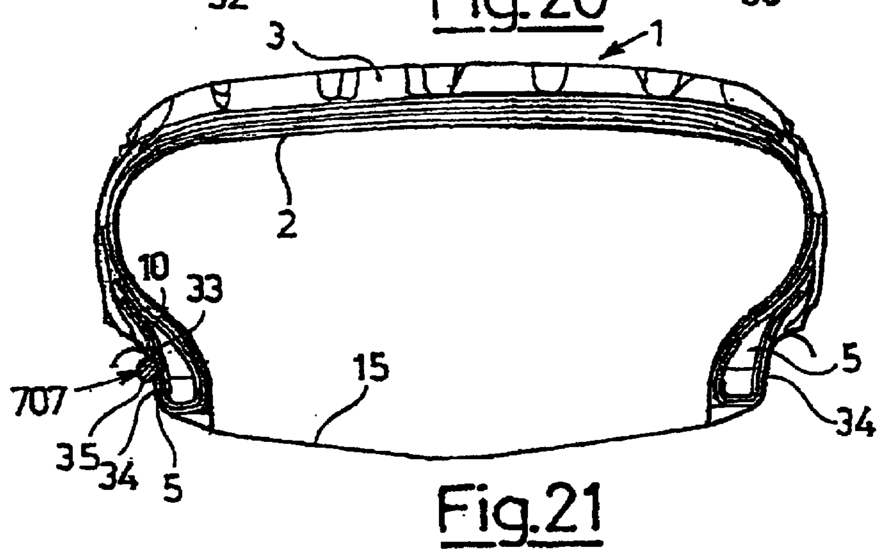
FIG. 21 shows a variant of the tyre of FIG. 19.

FIG. 21 shows a piezoelectric sensor 707 comprising a piezoelectric cable 10 fitted in a depression 33 in the bead 5. As an alternative, the cable 10 can be housed in an annular groove 35 recessed into a shoulder 34 of the rim 15, and is in contact with the outer surface of the bead 5. The cable 10 extends all the way around the circumference (or only along part of this circumference) of the depression 33 of the bead or of the depression 35 of the shoulder.

In a variant, the cable 10 can be embedded in a strip of rubber that is to be applied in the depression 33 of the bead.

Similar results can be obtained when the cable 10 extends along only a portion of the circumference of the depression 33.

The sensors 607 and 707 can be made using a cable 210 made up of piezoelectric portions and non-piezoelectric and conducting portions, like that shown in FIGS. 17 and 18.

The cable 10, in the case of smallest internal diameters from 15", can have the following configuration: number of piezoelectric portions 5 (length 50 mm each), alternating with non-piezoelectric segments whose lengths may differ from each other (for example, 4 segments of length 190 mm and one segment of length 240 mm).

Figure 22:
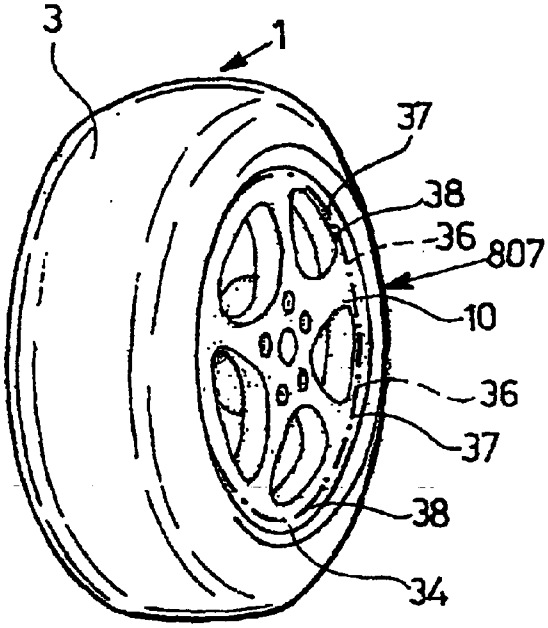
FIG. 22 shows another variant of the tyre of FIG. 19.
Figure 23:
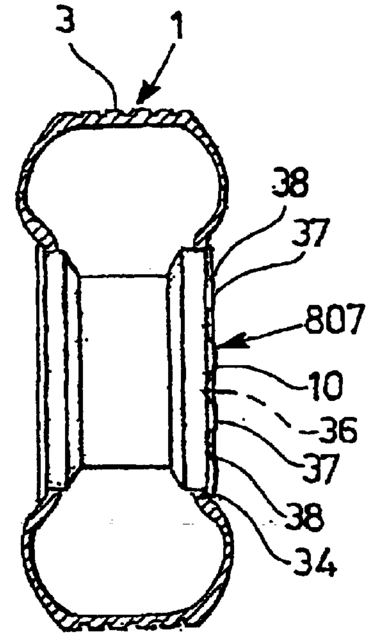
FIG. 23 is a cross-sectional view of the tyre of FIG. 22.

FIGS. 22 and 23 show a piezoelectric sensor 807 comprising a piezoelectric cable 10 applied to the shoulder 34 of the rim 15. The piezoelectric cable 10 comprises active sections 36, i.e. sections sensitive to the deformation of the tyre, alternating with inactive sections 37, i.e. insensitive to the deformation of the tyre. The alternating sections 36 and 37 have a predetermined length and are produced by passing the cable 10 through holes 38 in the shoulder 34 of the rim 15 to form the sections 36 and 37 located on the inside and outside, respectively, of the shoulder 34. In this way the sections 36 of the cable 10 remain in contact with the tyre bead 5 and detect its deformations, while the sections 37 do not remain in contact with the bead and do not detect its deformations.

The piezoelectric sensor 807 can be made from, for example, a piezoelectric cable having a diameter of 3 mm and the distance between the holes in the shoulder of the rim is such as to form five sections sensitive to the deformation, each with a length of 50 mm and alternating with five insensitive sections each with a length of 200 mm.

Figure 24:
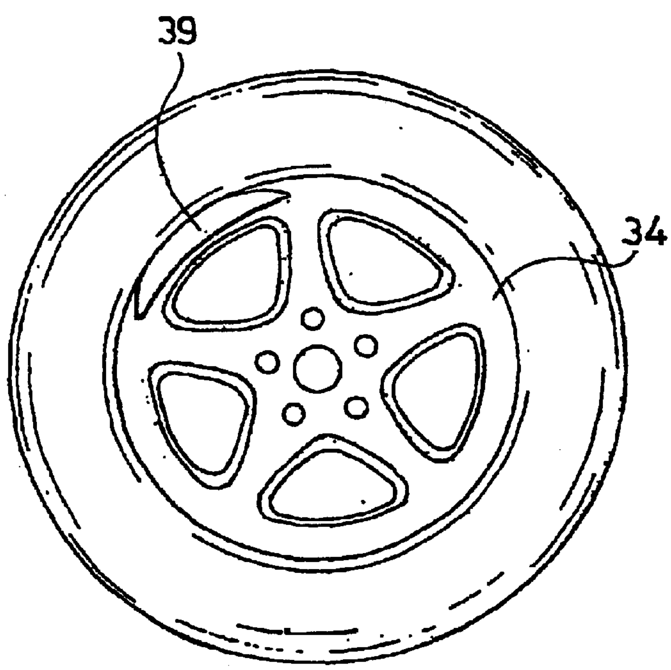
FIG. 24 shows a transmitter fitted to the tyre of FIG. 19.

FIG. 24 shows a transmitter 39 of radio signals attached to the shoulder 34 of the rim 15. The transmitter 39 is fixed to the rim by the crimping method, as conventionally used to fix the weights used in balancing the tyre/rim assembly.

This location of the transmitter has a number of advantages. It facilitates the fixing of the transmitter because it uses already known and tested methods available in tyre fitting workshops. It enables the transmitter to be fixed to the circumference of the rim in the area that is best "protected" from potential impacts. In addition, the mass of the transmitter itself can act as a mass in balancing the tyre.

As is known, a signal transmitter is provided with an antenna. With the sensors 607, 707 and 807 the antenna function can be performed by the mesh wrapping of the piezoelectric cable itself.

Figure 25:
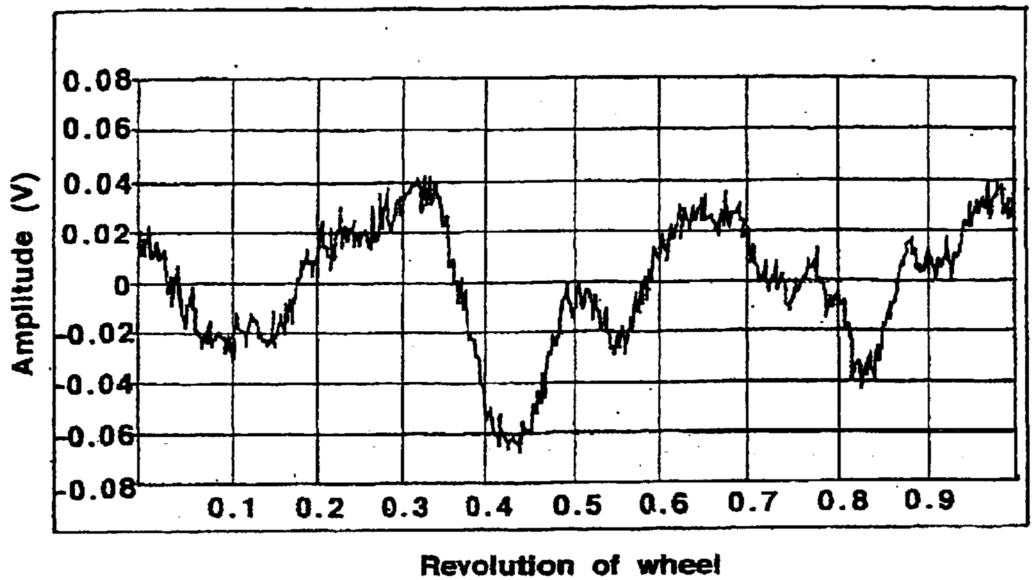
FIGS. 25 and 26 are graphs showing the signals emitted by a sensor fitted to the tyre of FIG. 19.
Figure 26:
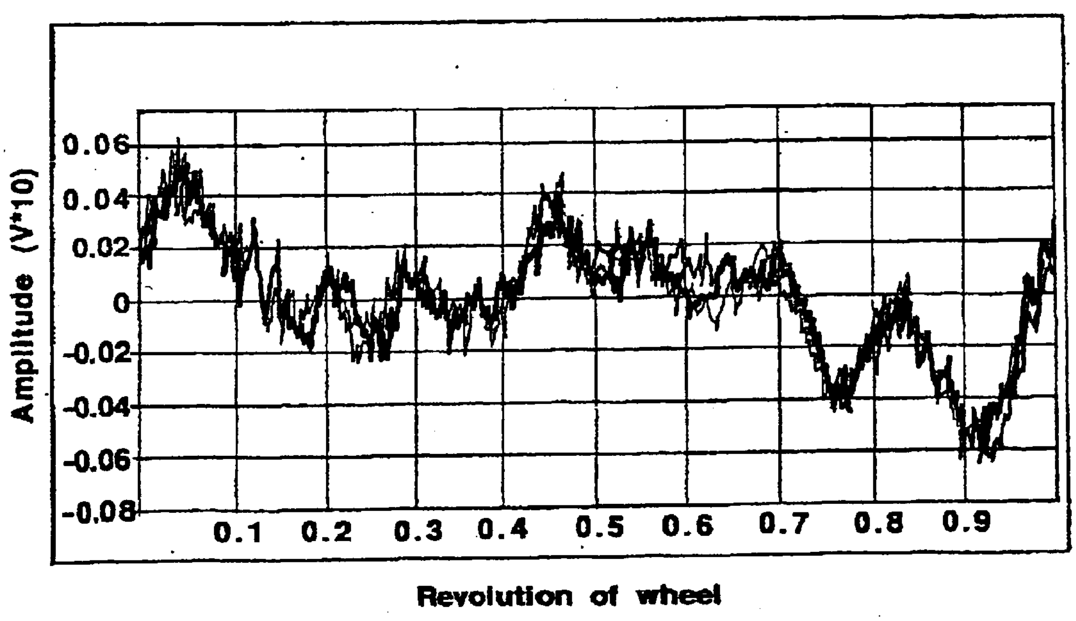

FIGS. 25 and 26 show examples of signals emitted by the piezoelectric sensor 607 or 707 for a P 6000 tyre of size 195 60 R15, rim 6J, inflation pressure 2.2 bar, subjected to vertical loading of 300 kg at a velocity of 50 km/h.

The graph in FIG. 25 shows the amplitude (Volts) of the signal emitted by the piezoelectric cable in an interval of time (sec) corresponding to one wheel revolution.

FIG. 26 shows the amplitude (Volts) of three signals emitted by the same piezoelectric cable in an interval of time (sec) corresponding to one wheel revolution, in three tests carried out under identical conditions at intervals of 24 hours. The graphs show that the results have good repeatability.

The location of the piezoelectric sensors 607, 707 and 807 on the bead and on the tyre rim has the following advantages.

It ensures consistency of location of the piezoelectric cable.

It makes it possible to have a ring of piezoelectric cable whose length is proportional to the smallest internal diameter of the rim and independent both of the various measurements of the tyres and of their conditions of use (pressure, load, etc.).

It reduces the mobility of the piezoelectric cable during high-speed operation of the tyre and thus reduces the effects of fatigue, indeed reducing fatigue almost to zero, and so extending the life of the cable to as much as the life of the tyre.

By comparing the signals emitted by the piezoelectric sensor over time, it is possible to determine tyre wear (irregular and/or regular) and therefore take action in time. If identical piezoelectric cables are fitted to both shoulders of the rim, the lateral behaviour of the tyre (drift) can be known directly.

Figure 27:
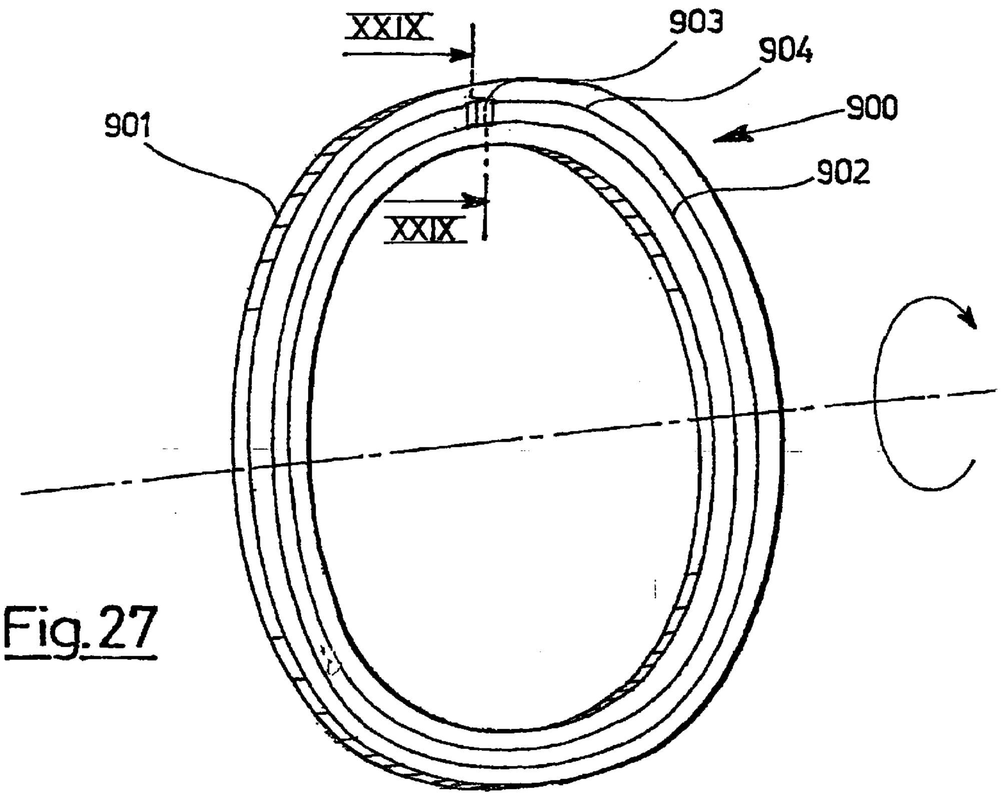
FIG. 27 is a perspective view of a kit for detecting the behaviour of a tyre according to the present invention.
Figure 28:
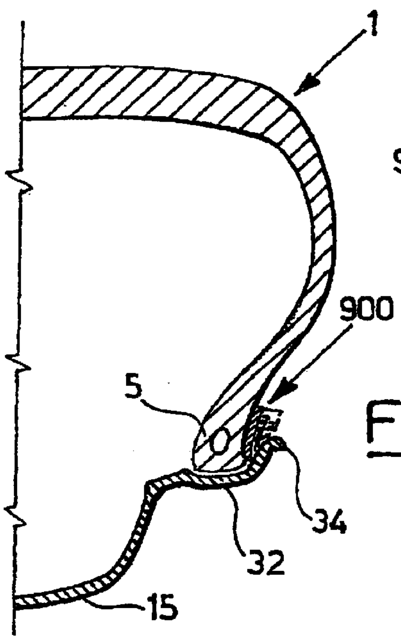
FIG. 28 is a partial cross section through a tyre mounted on a motor-vehicle wheel rim in which the kit of FIG. 27 is mounted between one of the beads of the tyre and a shoulder of the rim.
Figure 29:
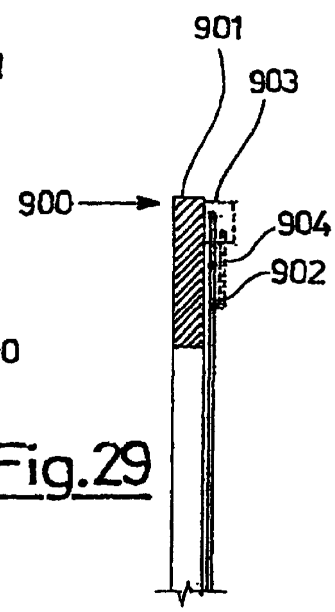
FIG. 29 is a partial cross section taken on the plane marked XXIX—XXIX in FIG. 27.

FIGS. 27–29 illustrate one particular embodiment of a kit 900 for detecting the behaviour of a moving tyre 1 according to the present invention.

The said kit 900 includes a supporting structure 901, a piezoelectric sensor 902, a transmitter 903 and an antenna 904.

The said supporting structure 901 is annular in shape and is preferably made of an elastic, still more preferably elastomeric, material. The said annular supporting structure 901 can be fitted to the bead seat 32 (or base) of the mounting rim 15, and laid between the shoulder 34 of the rim 15 and the outer surface of the tyre 1, in particular the outer surface of the bead area 5 of the above-mentioned tyre 1.

The cross section of this annular structure 901 is preferably more or less rectangular, with the shorter sides approximately parallel with the axis of rotation of the rim and the longer sides lying in planes approximately parallel with the mid-plane of the rim, corresponding approximately to the equatorial plane of the tyre.

Associated with this annular structure 901 is the turn of piezoelectric cable 902. Although FIGS. 27–29 show the turn 902 associated with the axially outer surface of the said annular structure 901, it is preferably associated with the axially inner surface which will be in contact with the outer surface of the tyre 1. The turn 902 is closed on two first clamps of a transmitter 903 that is also associated with the said structure 901.

When the turn of piezoelectric cable 902 is associated with the axially inner surface of the structure 901, its terminal part reaches the first clamp of the transmitter 903 by straddling an edge of the supporting structure 901, preferably the radially outer edge, or by passing through the said structure 901 via at least one hole (not shown).

The transmitter 903 is preferably provided with a fastener (not illustrated as known per se and not particularly significant for the purposes of the present invention) to fix the said transmitter 903 to the shoulder 34 of the rim 15.

The transmission antenna 904 consists of a turn of metallic material, preferably copper, connected to a second clamp on the transmitter 903.

The said turn of metallic material 904 is preferably associated with the axially outer surface of the said supporting structure.

The inside diameter of the annular structure 901 is approximately equal to the rim diameter of the mounting rim 15: it is preferably slightly less in order to create a small interference with the bead seat 32 to force the annular structure 901 to work under slight tension.

The elasticity of the supporting structure 901 is preferably such that it is not only possible for it to be passed over the shoulder 34 of the rim 15 during fitting but also for the abovementioned structure 901 to be used on rims of different diameters, preferably at least those with adjacent rim diameters: in other words a structure designed for use on a 14-inch rim can also be used on a 15-inch rim.

In FIGS. 27–29 the turns 902 and 904 are essentially linear. However, it is preferable for them to be nonlinear, more preferably undulating, so as to allow their diameter to increase without being stretched, for use on rims of different diameters.

The height of the lateral surfaces of the supporting structure 901, i.e. the amplitude of the circular annulus, is greater than the height of the shoulder 34 of the mounting rim 15, while the diameter of the turn of piezoelectric cable 902 is less than the outside diameter of the said shoulder 34, so that the said turn of cable 902 is contained between the outer surface of the tyre 1 and the axially inner surface of the said shoulder 34.

As to the diameter of the turn of metallic material 904 acting as the antenna, this is greater than the outside diameter of the said shoulder 34 in order to avoid physical contact with the latter and increase the efficiency of transmission.

The transmitter 903 is connected to a generator of electrical power (not shown) for its operation. In a preferred variant the above-mentioned kit 900 is self-powered because the electrical signal generated by the turn of piezoelectric cable 902 also powers, preferably via a buffer battery, the power circuit of the transmitter 903.

The piezoelectric sensor according to the invention can be used to analyse both the signal emitted during a single cycle of revolution of the tyre and the signal emitted within the period of two successive or generally close cycles, for example cycles lying within the interval of 25 cycles of revolution which precede the cycle under examination.

In particular, during a single cycle of revolution of the tyre it is possible to carry out a "relative/absolute analysis" of the signal emitted by the piezoelectric sensor. The analysis of the signal is absolute in that it relates to a single rotation (revolution) of the tyre, but it is relative in that it compares the variations of the signal which occur during a single revolution of the tyre with those recorded at constant velocity. By analysing the variations of the signal during a single cycle of revolution, it is possible to determine how the non-uniformities of the tyre, consisting of a non-uniform distribution of mass, such as that caused by the individual pitches of the tread pattern or by the means of fixing the piezoelectric cable to the tyre, "read" the road, or in other words interact with it.

The comparison between two successive cycles makes it possible to determine whether there has been a change of the conditions of adhesion between the tyre and the ground during the rotation of the tyre. In particular, in the presence of an uneven road surface or any other external perturbation, the piezoelectric sensor emits a signal which detects these perturbations but retains the characteristics which make it useful for the purposes of the invention. The comparison between the signal emitted during the rotation of the tyre at constant velocity and the signal emitted, for example, during braking makes it possible to determine variations of the time interval between predetermined distinctive elements of the signals and to detect the variation which has occurred in the behaviour of the tyre, such as the presence or absence of skidding, the loss or maintenance of adhesion of the tyre, the variation of the vertical load, and the presence of perturbations on the road (obstacles, etc.).

As already stated, the method according to the invention makes it possible in the first place to analyse the signal emitted during a predetermined interval of time, such as a single cycle of revolution of the tyre, or part thereof, or two or more consecutive cycles. In addition, the method also allows a comparison to be made between the signal emitted during the said predetermined interval of time and the corresponding signal emitted in an earlier interval of time.

Specifically, both the analysis and the comparison may be absolute or relative. They are absolute when the term of reference is a preset value, and relative when this term of reference is a value belonging to one of the earlier time intervals.

An analysis of the characteristics of the signal in a single time interval, e.g. within one cycle of revolution, will show how the nonuniformities of the tyre "read" the road, that is how they interact with it.

A comparison of the said characteristics in two different time intervals, e.g. in two successive cycles, will show whether the conditions of interaction between the tyre and the ground have modified as the tyre has been moving.

A comparison between the characteristics of the signals emitted during two different time intervals, e.g. during braking, will show up variations of time interval between predetermined distinctive elements of the signals and will reveal any variation that has occurred in the behaviour of the tyre such as, for example, the presence or absence of slip, the loss or otherwise of adhesion of the tyre, a change in vertical load, the presence of perturbations on the road (obstacles and the like).

FIGS. 30–40 refer to tests carried out on a vehicle (Opel Astra 2000) fitted with tyres of size 195/60R15 mounted on rims 6J, inflated to the normal operating pressure of 2.2 bar and each subjected to a vertical load of 3000 N, with a camber angle on the front axis of 0.5°. The said wheels are fitted with an elongate piezoelectric element of a piezoelectric cable, as described above, located between the bead and the shoulder of the mounting rim and running circumferentially around the tyre through an arc of approximately 360°.

Figure 30:
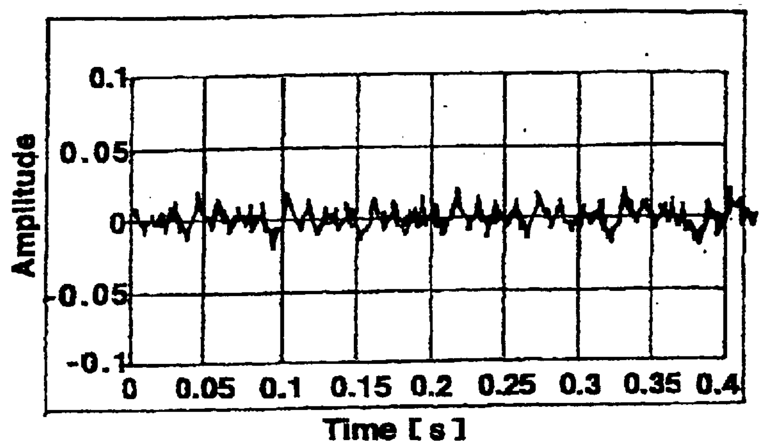
FIGS. 30 to 34 show graphs illustrating a signal emitted by a piezoelectric sensor fitted to a tyre, the signal representing a specific event.

To go into more detail, the graph of FIG. 30 shows the amplitude (expressed in mV) of the signal emitted continuously by the piezoelectric sensor against time (expressed in sec). The signal shown refers to a time period equal to 0.4 s, which corresponds to 2.36 revolutions of the wheel. More precisely, this graph refers to the signal coming from the front left wheel of the abovementioned vehicle moving in a straight line on smooth asphalt at a constant speed of 40 km/h.

Figure 31:
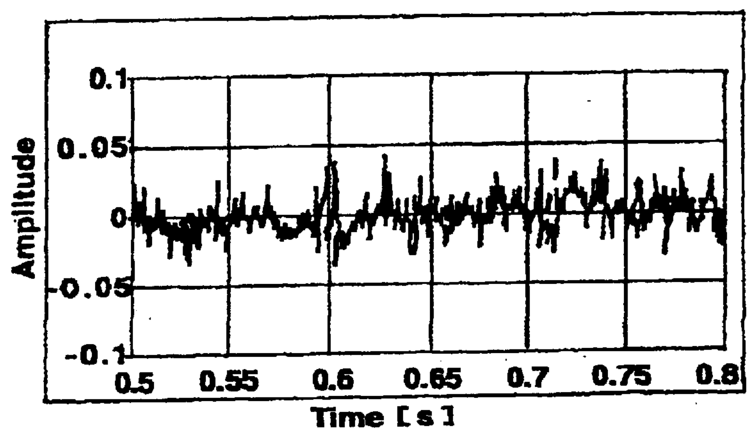

Similarly, the graph shown in FIG. 31 shows the amplitude of the continuous signal emitted by the piezoelectric sensor against time. The signal shown refers to a period of time equal to 0.8 s which corresponds to 4.71 revolutions of the wheel. More precisely, this graph refers to the signal coming from the front left wheel of the abovementioned vehicle travelling in a straight line on paving blocks at a constant speed of 40 km/h. It is clear from a comparison of the signals of FIGS. 30 and 31 that, when travelling at the same speed, the signal emitted by the tyre in contact with an irregular surface (such as the paving blocks) has greater amplitudes than a signal coming from a tyre rolling on a more even surface (smooth asphalt in FIG. 30).

Figure 32:
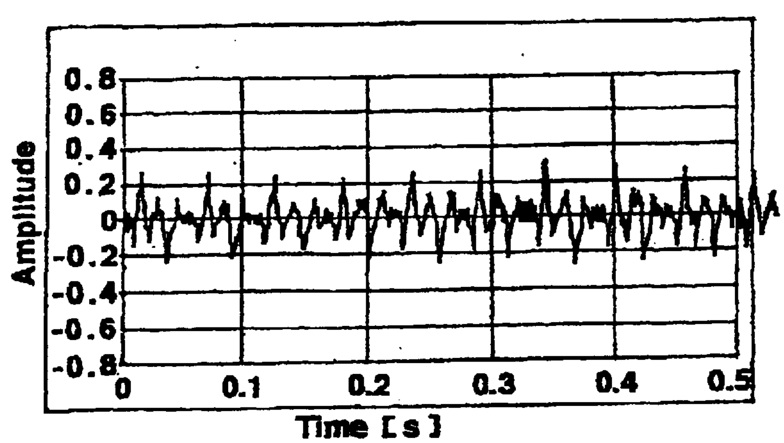

The graph, FIG. 32, shows the amplitude of the continuous signal emitted by the piezoelectric sensor against time, covering a period of time equal to 0.5 s, which corresponds to 8.47 revolutions of the wheel. This graph refers to the signal coming from the front left wheel of the abovementioned vehicle travelling in a straight line on smooth asphalt at a constant speed of 115 km/h. It is clear from a comparison of FIGS. 30 and 32 that, when travelling over the same surface, the speed parameter also influences the said signals: thus, the signal shown in FIG. 32, obtained from a wheel at high speed (115 km/h), has greater amplitudes than that from the same wheel moving at a slower speed (40 km/h).

The said electrical signals are sent, for example by a transmitter, to a receiver and from here to an electronic controller which processes the signals using mathematical algorithms known per se.

The Applicant, in accordance with one embodiment of the present invention and as illustrated in greater detail in the examples which follow below, has processed the signal coming from the sensor by a spectral frequency analysis using a Fourier transform (hereinafter "FFT analysis"—Fast Fourier Transform).

This analysis is preferably carried out on the signal acquired in a predetermined time interval at a predetermined rate. The frequency spectrum extracted by this analysis is then confined to the range of frequencies that describe the particular event which it is wished to monitor (e.g. between 70 and 250 Hz in the case of comfort).

The process performed by the method of the present invention can include, in combination with or as an alternative to the FFT analysis, the use of a second mathematical algorithm which associates a numerical value (index) with the amplitude of distinctive elements of the signal or of frequencies of the corresponding spectrum extracted by the said FFT analysis in the time interval or frequency range representing the event which it is wished to monitor.

The mathematical algorithm preferably used by the Applicant consists in determining the square root of the sum of the squares of the amplitudes of the said distinctive elements or the said frequencies belonging to the predetermined interval or range. This method of calculation is usually known as RMS (Root Mean Square, hereinafter termed "RMS calculation").

The RMS calculation can be replaced by equally significant mathematical algorithms designed to achieve the same result. In this connection, the method of calculation known as M.E.V. (Mean Effective Value) may be cited. Another possible method of calculation is the calculation known as V.D.V. (Vibration Dose Value) according to British Standard No. 6841, 1987.

The result obtained with these calculations is an index that represents the magnitude of the event under examination and that refers to the interval of time in question.

The processing method described above produces an index, corresponding to the monitored event, that varies continuously with the event itself and at the preset rate of detection of the signal.

This index can be used in a number of different ways.

For example:

to represent the variation of this index as a function of distance travelled or of time;

to store a value (maximum, mean, minimum) of this index, or the sequence of the said values in time, e.g. in order to extract information on the driving style of the driver and/or on a predetermined road journey (for example, if the driver makes the same journey each day it is possible to extract useful information about the type of tyre most suited to his or her requirements);

to set a threshold value of this index at which an alarm signal (e.g. in the form of a luminous or acoustic signal) is activated which the driver can detect;

to calculate an instantaneous index (with a rate of detection of the signal value instant by instant) and compare it with a predetermined threshold value so as to provide the driver with constantly updated information on the event being monitored;

to calculate a progressive index of the event (meaning the sum of the instantaneous indices within a particular interval of time), and compare it with a predetermined threshold value in order to alert the driver to the imminence of a dangerous situation or a reduction in the available margin of safety;

to intervene on the vehicle's motion control devices, as discussed earlier.

A number of examples are given below showing the calculation of indices associated with specific events in the movement of a vehicle, and the corresponding states of stress of the tyre. These are performed on the basis of the method of detecting and determining the behaviour of a tyre according to the invention. All the examples described below refer to tests performed on the vehicle and sensor referred to above.

EXAMPLES

First Part

Example 1

Index Representative of the Road Condition

The description of this type of event involves continuous monitoring of the surface characteristics of the ground over which the vehicle is moving, by identifying the presence of macroscopic irregularities, such as potholes, undulations, breaks in the road surface, and so forth.

The index representing the condition of the road was calculated by:

acquiring the signal emitted by a sensor in accordance with the invention in a 6-second time interval and by a sampling rate (i.e. detecting the instantaneous value of the signal) of 3000 points per second, performing an FFT analysis on the acquired signal to determine the corresponding spectrum of frequencies;

confining this spectrum to the range of frequencies lying between 0 and 70 Hz, performing the RMS calculation within the abovementioned range of frequencies.

As indicated, the result of this calculation is a numerical value (or index) which can be put through one of the operations mentioned earlier, such as for example representing this index as a function of an interval in space (distance travelled by the vehicle) or in time. It can also be compared with a predetermined threshold value (alarm) defining acceptability of the behaviour of the tyre or vehicle. This provides the driver with periodical information on the condition of the road and on the corresponding state of stress of the tyre or vehicle.

Irregularities in the road surface, which are reflected in the signal transmitted by the sensor, as already explained with reference to FIGS. 30 and 31, can be quantified by the abovementioned index For example index L equals smooth road, index I equals uneven road and index S unmetalled road.

The information summarized in the value assumed by this index can be used by the driver, for example, to avert situations of danger by modifying his driving behaviour accordingly.

For instance, if the index is close to a predetermined value (threshold of danger), the driver is informed of the fact that the condition of the road requires particular care during braking or that the vehicle or man system is unusually stressed.

Example 2

Index Representing the Efficiency/Regulation of the Dampers of a Vehicle

The signal sent by a sensor according to the present invention may contain anomalous frequencies identifiable as frequencies of resonance of the vehicle suspensions excited by a rough road surface.

Under normal conditions the vibrations of the suspensions are damped by the dampers and are therefore of limited magnitude.

However, in the event of malfunction of the dampers, as when they are discharged, the suspensions vibrate at their own resonant frequencies in a way dissimilar to their normal operation.

The signal emitted by the sensor is modified in consequence and these vibrations are easily detectable from spectrographic analysis of the said signal.

The corresponding index is calculated by:

acquiring the signal emitted by the sensor over a 6-second time interval at a sampling rate of 3000 points per second, performing FFT analysis on the acquired signal to determine the corresponding spectrum of frequencies;

confining this spectrum within the range of frequencies lying between 0 and 20 Hz, and performing the RMS calculation on the above range of frequencies.

Advantageously, the description of the interaction between road, tyre and dampers-suspensions enables this index to be used to adjust the suspensions even while the vehicle is moving, if the vehicle is fitted with "active suspension".

Example 3

Index Representing the State of Instantaneous Stress of a Tyre

As already indicated and explained above, the signal obtained from a sensor according to the invention can also be used to objectively analyse the interaction between the tyre and the contact surface and indicate the state of mechanical stress of the tyre (both instantaneous and progressive) as it moves over the said surface.

In other words the signal obtained from the sensor can be used to monitor the structural integrity of the tyre.

The progressive state of stress of the tyre, meaning the history of the stresses to which the tyre has been subjected over time, can be used to quantify the total fatigue of the tyre in order to predict its residual life.

The index representing the state of stress of the tyre was calculated by:

continually acquiring (every second) the signal emitted by the sensor over the time interval of 1 second at a sampling rate of 5000 points per second, performing an FFT analysis on the acquired signal to determine the corresponding spectrum of frequencies;

confining the spectrum to the range of frequencies lying between 0 and 200 Hz, and performing the RMS calculation within the abovementioned range of frequencies.

The index produced by this method can be compared with an instantaneous threshold index and/or with an index denoting the maximum admissible threshold. The tyre manufacturer will supply these indices directly to the motor vehicle manufacturers. The index in question is extremely important in the case of tyres being reconstructed in which casing fatigue is a significant factor in deciding whether to go for reconstruction.

Example 4

Index Representing the Available Grip

In accordance with the invention, the Applicant has largely solved the problem of how to determine in real time the efficiency of a braking action if such were applied to a tyre (i.e. the forcible reduction of its angular velocity).

The efficiency of a braking action is influenced by a countless number of parameters, the most important of which is the coefficient of friction between the tyre and the contact surface on which it is moving.

However, the coefficient of friction cannot be measured instantaneously and cannot be defined a priori because of the fact that it varies continuously from point to point on the said surface and depends on the condition (dry, wet, snowy or icy) of the said surface.

Using the invention it has been found how to identify the condition when the tyre is at the limit of its grip.

The signal obtained from the sensor has a harmonic content proportional to the speed of rotation. At the limit of grip, at least some of the tread reliefs (blocks and/or ribs) begin to slip and it has been found that a condition of slip between these reliefs and the road generates vibrations in the frequency range 500 Hz to 1000 Hz, independently of the speed of rotation.

These frequencies are contained in the signal emitted by a sensor according to the invention. It is therefore possible to detect a condition in which grip is at its limit, in a longitudinal direction (braking or accelerating) sideways (tyre drifting) and in a condition of combined stress in both of these directions, by detecting the presence, in the signal, of frequencies lying within the abovementioned range.

The index of available grip was defined by:

- acquiring continually (every second) the signal emitted by the sensor in the time interval of 1 second at a sampling rate of 4000 points per second,
- performing an FFT analysis of the acquired signal to determine the corresponding spectrum of frequencies;
- confining this spectrum within the range of frequencies of between 500 and 1000 Hz, and
- performing the RMS calculation on the abovementioned range of frequencies.

The index calculated in this way measures the overall magnitude of the vibrations produced by the slipping of the aforementioned tread reliefs on the contact surface. The vibrations increase as slip increases. The grip index is therefore correlated with slip.

Example 5

Index Representing Tyre Uniformity

A wheel comprising a rim free of structural nonuniformities and a tyre fitted with a sensor according to the invention is rolled on a smooth surface under predetermined load conditions, at rated operating pressure and at constant speed. By this means the nonuniformities of the tyre itself, due e.g. to its manufacturing process, can thereby be assessed.

This can be done by the method of the invention by performing the following steps:

- acquiring the signal emitted by the sensor in a 6-second time interval at a sampling rate of 3000 points per second,
- performing an FFT analysis on the acquired signal to determine the corresponding spectrum of frequencies;
- analysing this spectrum by filtering out the harmonics of the tyre, that is by performing a "harmonic analysis" of the spectrum in the range lying between the first harmonic and the twentieth harmonic; and
- performing the RMS calculation on the abovementioned range of harmonics.

The above harmonic analysis identifies those specific nonuniformities that generate peaks whose amplitudes cause the tyre's limits of acceptability, as established by the manufacturer of the tyre and/or vehicle, to be exceeded.

The result of the RMS calculation is therefore an index which can be used to plan the modifications to be made to the tyre in order to eliminate these nonuniformities.

Example 6

Index Representing Tread Wear

Having first selected a reference velocity and a reference journey, such as 40 km/h along a straight stretch of road at least 200 metres long with a generally smooth and even surface, at predetermined intervals, (e.g. once a month), a first embodiment of the invention is to perform a comparison (in terms of amplitude and area subtended) between the peaks of the distinctive elements of the signal produced by a sensor of the invention as the tyre moves along the said stretch of road at the abovementioned speed, and the corresponding peaks of the signal stored in memory during an earlier test carried out in the same way.

A change in the said amplitude and/or in the said subtended area indicates that tread wear has taken place in the meantime, whereas nonhomogeneous change in one or more of the said peaks (compared with other peaks) indicates the possible presence of uneven tread wear.

Alternately, in an alternative embodiment of the invention, as described in the previous Example 5, this event can be detected by performing a harmonic analysis of the frequency spectrum extracted by FFT analysis of the acquired signal, by analysing the harmonics relating to the pitches of the tread pattern.

The abovementioned harmonic analysis gives the values of the amplitudes of these harmonics, which are proportional to the thickness of the reliefs (ribs and/or blocks) of the tread pattern and the RMS calculation associates a wear index with the above mentioned values. These values are at their greatest for new tyres and at their lowest for completely worn tyres. A threshold value is defined for the wear index, below which the tyre is to be considered as worn and therefore to be replaced by a new tyre.

Second Part

The information contained in the signal coming from a sensor according to the invention fitted to a vehicle wheel is descriptive of variations in forces and velocities applied to the said wheel.

Depending on the type of event which it is wished to monitor and/or control, it may be necessary to break the said signal down into its components (that is, the above variations in forces and velocities) along three reference axes x, y, z orthogonal to each other, as follows:

- variation of the vertical force $\Delta Fz$;
- variation of the longitudinal force $\Delta Fx$;
- variation of the lateral force $\Delta Fy$;
- variation of the angular velocity $\Delta\omega$.

In accordance with one embodiment of the invention, this breaking down of the signal is performed on each signal coming from each individual wheel of the vehicle.

In order to be able to calculate the individual components from a global value, such as a single signal emitted by a single sensor, the following equations describing the dynamics of the vehicle are employed:

- equation describing the transfer of load from one side of the vehicle to the other;
- equation describing the transfer of load between the front axle and the rear axle;
- equation describing the yawing motion of the vehicle, and
- equation for motion in a straight line (vertical dynamics of the vehicle).

Figure 41:
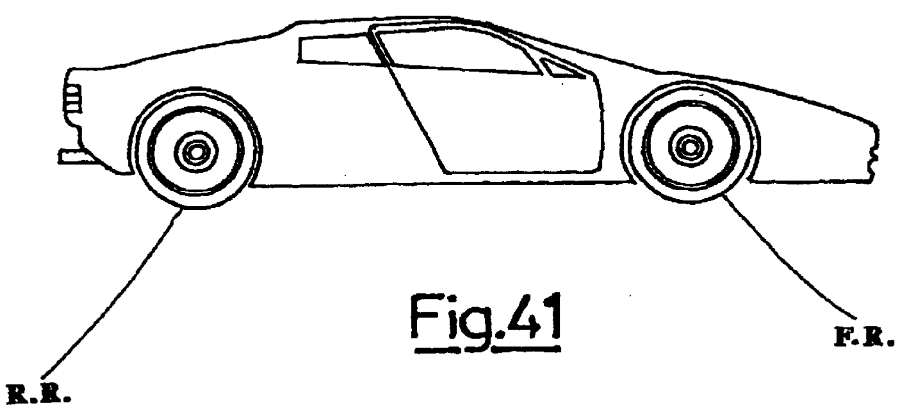
FIG. 41 shows a motor vehicle fitted with wheels having piezoelectric sensors according to the invention.

For example, if it is wished to obtain the variations in the lateral force $\Delta Fy$ during cornering, the procedure is as follows:

- the signals for the four wheels of the vehicle are acquired (FIG. 41), viz front right (F.R.), front left (F.L.), rear right (R.R.), rear left (R.L.),
- each of these signals is analysed by one or more methods selected from FFT analysis, selection of frequencies in the spectrum, and RMS calculation; and
- the RMS values of the front wheels (front axle) are computed separately from those of the rear wheels (rear axle).

This processing, as can be seen, consists in weighing up the individual components characteristic of the front axle. i.e. the overall RMS value of the front axle (RMS_FRO), given by the sum of the RMS values of the front right wheel (RMS_F.R.) and of the front left wheel (RMS$_{13}$ F.L.), is made equal to the sum of the:

variations of vertical force on both front wheels (that is, $\Delta Fz\_F.R.+\Delta Fz\_F.L.$), variations in the lateral force on both front wheels (that is, $\Delta Fy\_F.R.+\Delta Fy\_F.L.$), variations in the longitudinal force on both front wheels (that is, $\Delta Fx\_F.R.+\Delta Fx\_F.L.$), and variations in the angular velocity of both front wheels (that is, $\Delta\omega\_F.R.+\Delta\omega\_F.L.$).

As to the terms of this equation it should be emphasized that:

a) the signal analysed is continuous and cyclical, besides being descriptive of the overall state of stress of the tyre, with periods equal to one revolution of the wheel. It is possible to calculate the angular velocity of the wheel by measuring the period of the signal (hence each wheel revolution—trigger effect), or by analysing the signal within the period, i.e. before the wheel revolution is completed. In the latter method, distances between peaks of the instantaneous signal are compared with the corresponding distances of a signal relating to a previous period, and from these one can read the angular velocity even within one wheel revolution: rapid and sudden changes in the velocity of the wheel can by this means be assessed. Accordingly, the terms relating to the angular velocities in the abovementioned equation are known;

b) when the low-frequency dynamics of the vehicle are ignored, variations in vertical force are equal and opposite on the wheels of the same axle, meaning that the algebraic sum of these variations on each axle is zero;

c) assuming that, in the example in question, the cornering manoeuvre is carried out without acceleration or deceleration, the algebraic sum of the variations of longitudinal force on each axle is again zero.

Given these premises, in the particular case in question, the equation under examination is reduced to equality between RMS_FRO and the variation in lateral force on the front axle. Because RMS_FRO is known (derived from the signal by the method described above), this equation yields the value for the abovementioned variation in lateral force on the front axle.

For the rear axle the same procedure is followed.

Should the premise stated in point c) not apply, in other words should the cornering manoeuvre be carried out with acceleration or deceleration, the algebraic sum of the variations of longitudinal force on each axle is not zero and in order to be able to solve the equation it must be combined with the equation on the yawing motion of the vehicle. By this means it is possible to calculate all the unknowns, i.e. the variations in lateral force and in longitudinal force.

Similarly it is possible to then determine the other variations of force. For example, in the event that the manoeuvre in question is purely a matter of acceleration or deceleration, the equation describing the transfer of load between the rear axle and the front axle is written in combination with the yawing equation: this gives the variations in longitudinal force.

Given below are a number of examples showing the calculation of indices correlated with specific events relating to the behaviour of a vehicle on the basis of the method according to the present invention in a case in which it is required to break the signal down into its components, as described above.

Example 7

Index Representing Comfort

In accordance with the invention the characteristics of the signal coming from a sensor associated with a tyre can be used to objectively analyse the tyre/contact surface interaction and quantify the disturbance to this interaction for the benefit of the driver of the vehicle and any passengers. In other words one of the items of information contained in the signal is utilized to determine a comfort index representing the well-being of the occupants of the vehicle.

The index representing comfort was calculated by:

acquiring the signal emitted by the sensor in a 6-second time interval at a sampling rate of 3000 points per second, performing FFT analysis on the acquired signal to determine the corresponding spectrum of frequencies;

confining this spectrum to the range of frequencies lying between 70 and 250 Hz, and performing the RMS calculation on the abovementioned range of frequencies.

Figure 35:
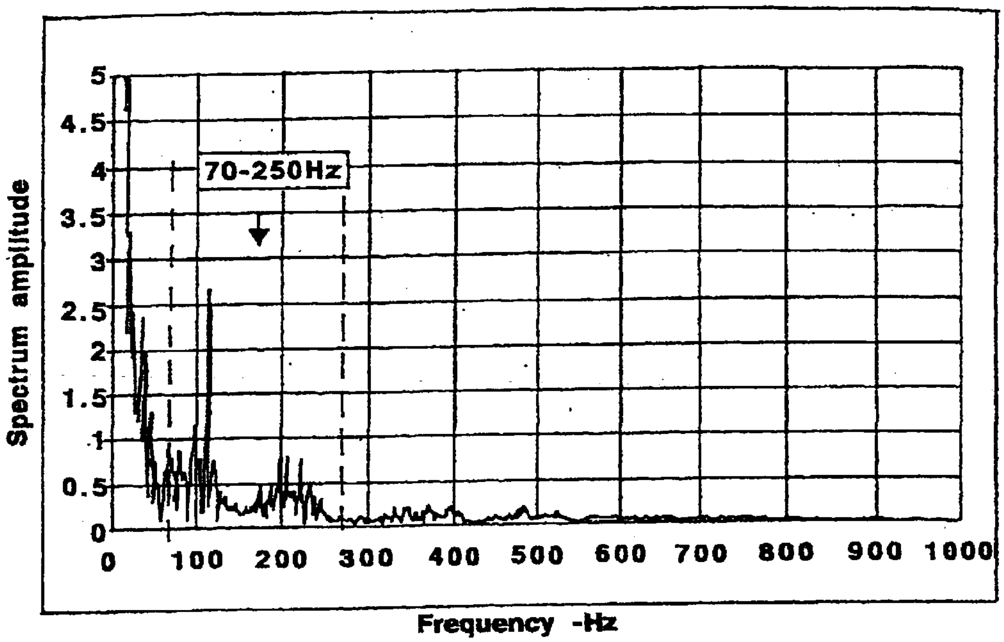
FIG. 35 shows the spectrum of frequencies extracted from the signal of FIG. 31 after processing by the Fourier transform method.

The graph, FIG. 35, shows the frequency spectrum extracted by the FFT analysis of the signal and identifies the predetermined range of frequencies taken to describe the phenomenon in question. This range was divided up with a resolution of 0.5 Hz. The spectrum can also be divided up on the basis of the frequency bands which characterize the physiological sensitivity of man as reported in specific international standards (e.g. in standards ISO 2631/1, first edition dated May 15, 1985 and 2631/2, first edition dated Feb. 15, 1989).

The procedure for breaking the signal down, as described earlier, is carried out for each of the lateral, longitudinal and vertical directions in order to obtain three comfort indices, one for each reference axis.

In particular, a rectilinear comfort index associated with variations in vertical force generated by the characteristics of the contact surface, a cornering comfort index associated with variations in lateral force generated by the behaviour of the vehicle during drift, and a longitudinal-comfort index associated with variations in longitudinal force generated by the presence of driving or braking torque are determined.

It is of course possible to have a "global" comfort index by processing the signal as in the previous examples, without breaking it down into its axial components, in which case the index may also refer to a single tyre.

Figure 36:
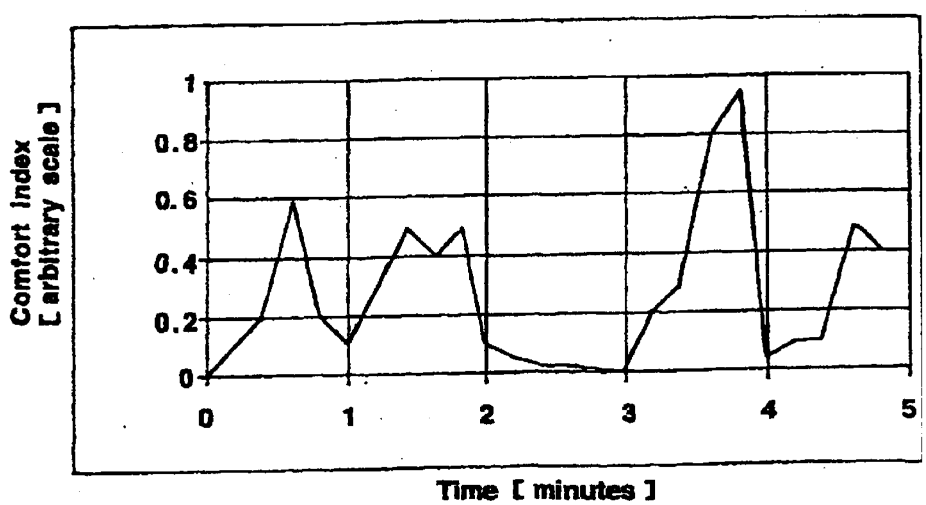
FIGS. 36 and 37 show, against time, the index associated with the comfort of the vehicle, instantaneous in the first case and progressive in the second.
Figure 37:
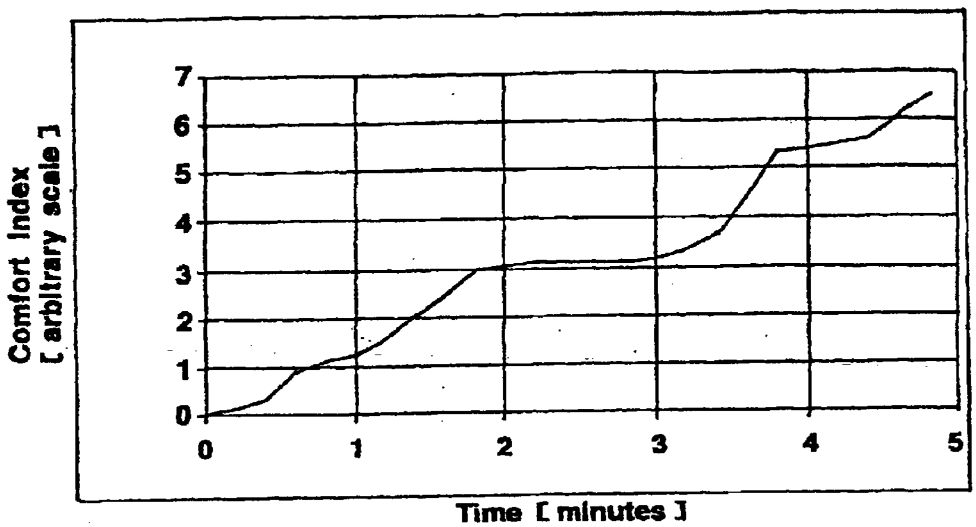

A comfort index obtained by the RMS calculation, according to the invention, is illustrated in FIGS. 36 and 37.

In detail, these figures show, respectively, the instantaneous comfort index and the progressive comfort index against time. The progressive comfort index, read at a given time $t_1$, represents the summation of all the comfort indices from time to $t_0$ to time $t_1$.

Figure 38:
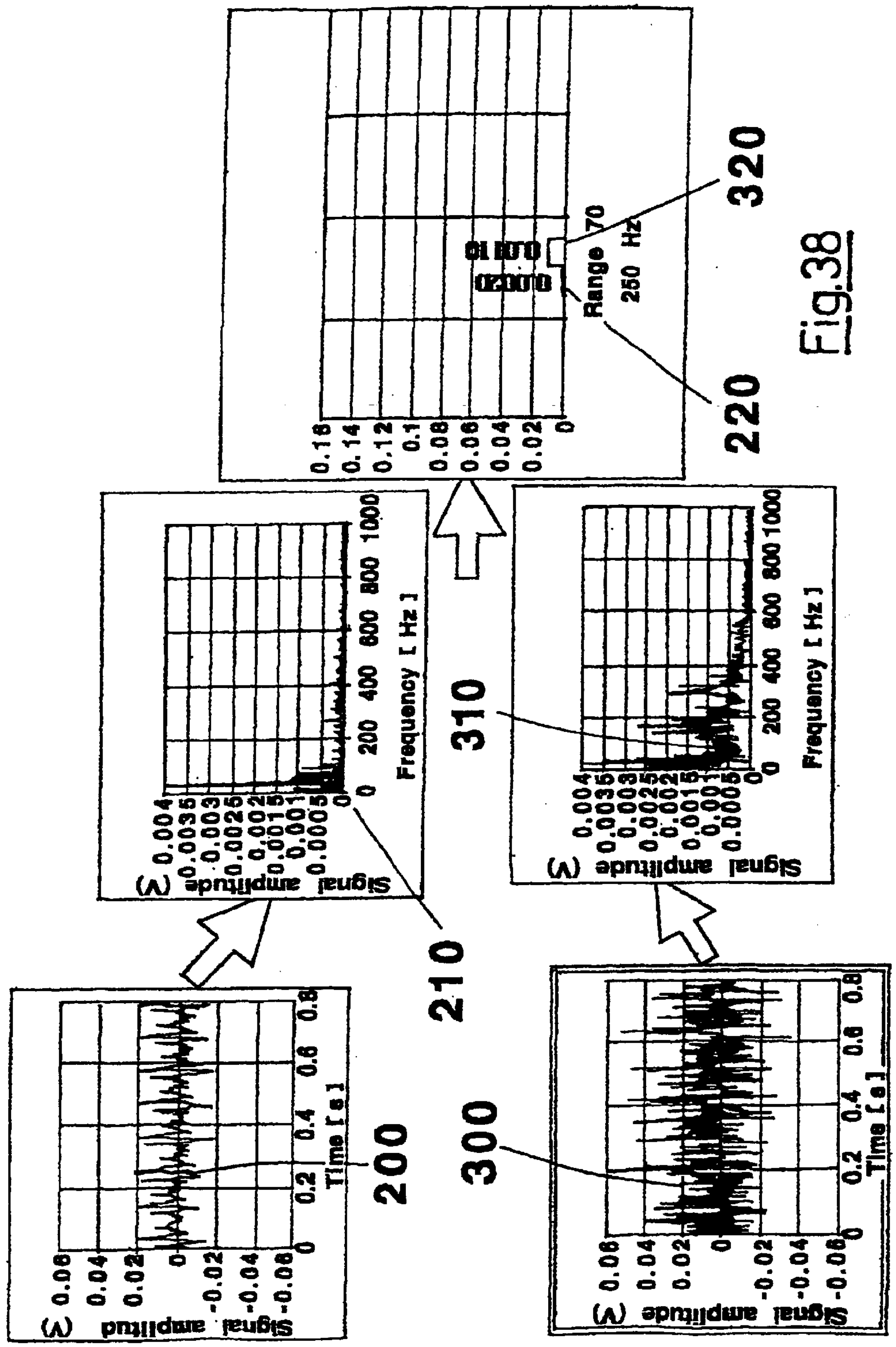
FIG. 38 shows the comfort index and the successive processes performed on it to obtain the same in two different conditions of operation of a tyre.

FIG. 38 shows a comparison between the comfort index obtained from a signal relating to a tyre moving over two contact surfaces that are very different from each other.

In detail, the signal 200 in FIG. 38 comes from a sensor according to the invention associated with the tyre on the front right wheel of the abovementioned car moving in a straight line on asphalt at a speed of 60 km/h. This signal, processed by FFT analysis, has yielded a frequency spectrum 210. Similarly the signal 300 in FIG. 38 comes from an identical sensor associated with the tyre on the front right wheel of the same car moving in a straight line on paving blocks at a speed of 60 km/h. This signal, processed by FFT analysis, has yielded the frequency spectrum 310. The RMS calculation conducted on the spectra 210 and 310 has produced the respective comfort indices indicated at 220 and 320. If the optimal comfort index is set at 100, the result is a comfort index of 70 for the vehicle on asphalt and a comfort index of 30 for the vehicle moving on paving blocks.

It should be noticed that it was decided to use a convention whereby the lower the comfort index the lower the comfort.

It is possible to set a threshold value for the comfort index with which the driver can compare himself instant by instant or at predetermined intervals of time.

This threshold index can be set by the driver himself or be defined by dividing drivers up into a number of groups characterized by different driving habits: for example, it is likely that this threshold value may in fact be very different between individuals used to long journeys and individuals who use the car only rarely.

In addition, the progressive comfort index, if calculated from the beginning of the journey, can express the physical fatigue of the driver accumulated over the course of the journey and its comparison with a predetermined threshold index can advise the driver when to stop without jeopardizing his safety and that of the passengers. In this way the necessity of a break is not related to the number of miles actually travelled but to the physical fatigue of the driver, since a road that is disjointed and taxing to negotiate induces greater tiredness than a straight road under good conditions.

In accordance with the invention the comfort index can be used to operate vehicle control devices, such as the suspensions, by varying their stiffness to suit the condition of the road and/or the preferences of the driver.

Third Part

It has been found that, depending on the type of event being monitored, the above spectral frequency analysis (FFT) may be unnecessary.

For instance, if the magnitude of the event considered is related to the amplitude of the signal supplied by the sensor of the invention, an analysis of this signal against time is sufficient.

This variant of the invention only includes the stage of processing the signal by the RMS calculation explained earlier.

A number of examples are given below showing the determination of indices correlated with specific events relating to the behaviour of a vehicle on the basis of this variant of the invention.

Example 8

Index Representing the Phenomenon of Aquaplaning

In aquaplaning conditions, for a given speed of advance of the vehicle, the water that strikes the surface of the tyre reaches a hydraulic pressure equal to that which the tyre exchanges with the contact surface over which it is moving.

This means that the water building up under the footprint of the tyre tends to lift the tyre (hydraulic thrust) and reduce the portion of tyre in contact with the said surface, in other words the footprint area diminishes.

To monitor this event requires the use of at least one sensor of the invention fitted to at least one of the front wheels of the vehicle, because it is the front wheels that first develop the aquaplaning phenomenon.

The amplitude of the signals coming from the sensors depends on the interaction between the tyre and the road and hence also on the dimensions of the footprint of the tyre. During aquaplaning the latter tends to reduce as the phenomenon increases, and hence the amplitude of the signal reduces.

Therefore, under aquaplaning conditions, it is important to monitor the amplitude of the signals coming from the front wheels: in particular it is important to monitor the gradient (i.e. the variation over time) of this amplitude.

The gradient increases as the severity of the phenomenon increases.

The RMS processing referred to above, directly applied to the signal emitted by the sensor, produces an aquaplaning index which, in much the same way as already described, can be processed by one of the operations cited in the previous examples.

In particular, having defined an event threshold index, it is possible to compare the instantaneously calculated index with the said threshold index and so alert the driver to the likelihood of imminent aquaplaning: in which event it would be advisable to reduce the speed of the vehicle.

Once again, the instantaneous index can be used to regulate and/or intervene automatically on the relevant control systems of the vehicle (ABS and the like).

Example 9

Index Representing Tyre Deflation

If a tyre is inflated at normal operating pressure and moving over the contact surface under predetermined standard conditions, the sensor of the invention will generate a periodic signal, with a periodicity equal to one revolution of the wheel which has a well-defined shape depending, in particular, on the characteristics of the tyre itself.

Figure 33:
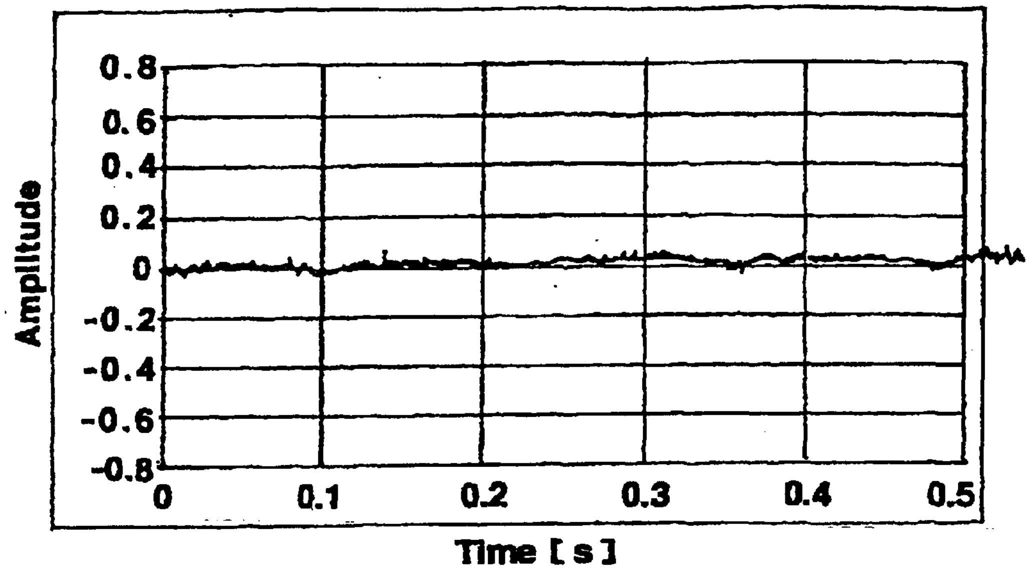

FIG. 33 illustrates the signal obtained from a sensor of the invention associated with the front right wheel of the above-mentioned vehicle as it moves along a straight path on a basically smooth and even surface at a speed of 60 km/h. The shape of the signal, especially the amplitude of the distinctive elements of this signal, over the time interval considered (0.5 sec), reflects this condition.

Figure 34:
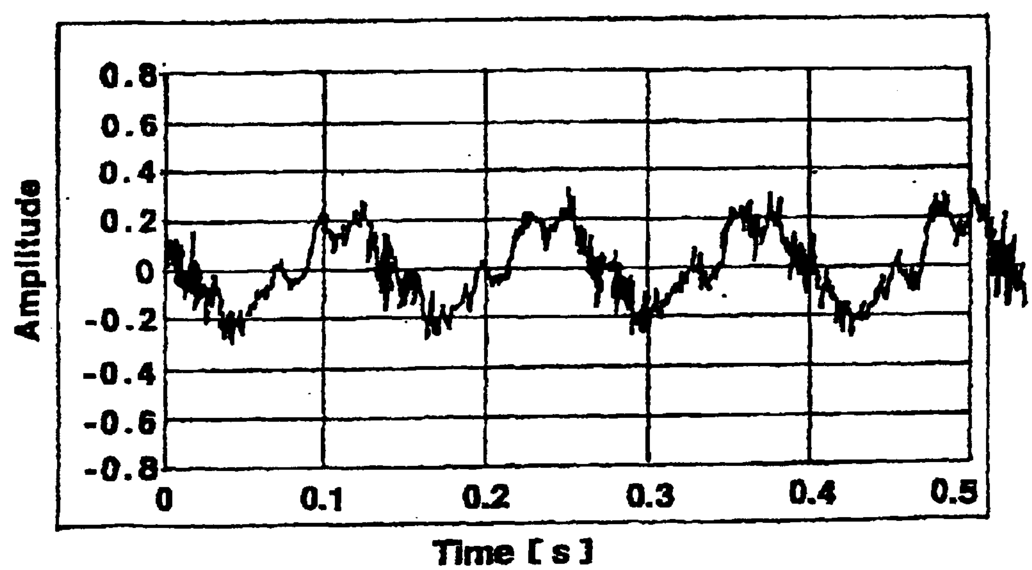

In the event of deflation, the shape of this graph changes profoundly, as illustrated in FIG. 34, which shows the signal generated by the same wheel as in FIG. 33, moving under the same conditions of travel, with an inflation pressure equal to 50% of the normal operating pressure.

Even in this event the signal generated by the sensor of the present invention can still be used, in particular by RMS calculation, to find a descriptive index, instant by instant, of the state of inflation of a tyre. Advantageously, after having predetermined a threshold index, it is possible to generate, by means of a comparison of the threshold index with the instantaneous index, a specific signal, such as an alarm, which is then sent to the driver of the vehicle to alert him to the partial or total deflation of the tyre.

It should be emphasized that knowledge of this instantaneous index enables automatic adjustment and/or intervention to be applied to the vehicle control systems and/or restoration of the inflation pressure of the tyres on the moving vehicle.

Example 10

Index Representing Roadholding in a Straight Line

Roadholding in a straight line is expressed as the variation of the dynamic vertical load on a wheel of a given moving vehicle. The smaller this variation in vertical dynamic load when the operating conditions change, the greater the roadholding of the tyre fitted to the said wheel. In other words, the tyre that tends to lift the least as it moves over a contact surface is the one that has the best roadholding characteristics.

The index of this event, representing the variation in vertical load that occurs on the said wheel, can be calculated as described in the previous Examples 6 and 7 and, by analogy with the accounts given repeatedly with reference to other cases, can be used if necessary to adjust automatic vehicle control devices.

Fourth Part

It has been found that, even when the determination of the event, relative to its type, can be limited to an analysis of the variation of a signal generated by a sensor of the invention as a function of time, it may be necessary and/or advisable to break the signal down into its axial components, as described previously.

This variant of the invention comprises only the processing of individual components of the signal by the RMS calculation referred to above.

There now follows a number of examples showing the calculation of indices relating to specific events in the behaviour of a vehicle on the basis of this variant of the invention.

Example 11

Index Representing the Transfer of Vertical Load

The information on the transfer of vertical load is obtainable by simultaneously analysing variations in the vertical force component (load) contained in signals coming from sensors of the invention associated with at least one pair of wheels of the said vehicle.

Because the amplitude of this component depends on the vertical load on each wheel, it is observed during events such as travelling around a curve, braking and accelerating, that the amplitude of the signal increases on the more heavily loaded wheels during the event in question and becomes less on the other wheels.

This event can easily be distinguished from an increase in the amplitude of the signal caused by an increase in speed: by comparing together the signals of a moving vehicle (travelling in a straight line at a constant speed) at a velocity $v_1$ and subsequently, at a velocity $v_2 > v_1$, it will be seen that the greater amplitude of the signals, when considering a vehicle moving at velocity $v_2$ as compared with the same vehicle moving at velocity $v_1$, occurs in all wheels simultaneously, since all four are supplying the same speed information.

Figure 39:
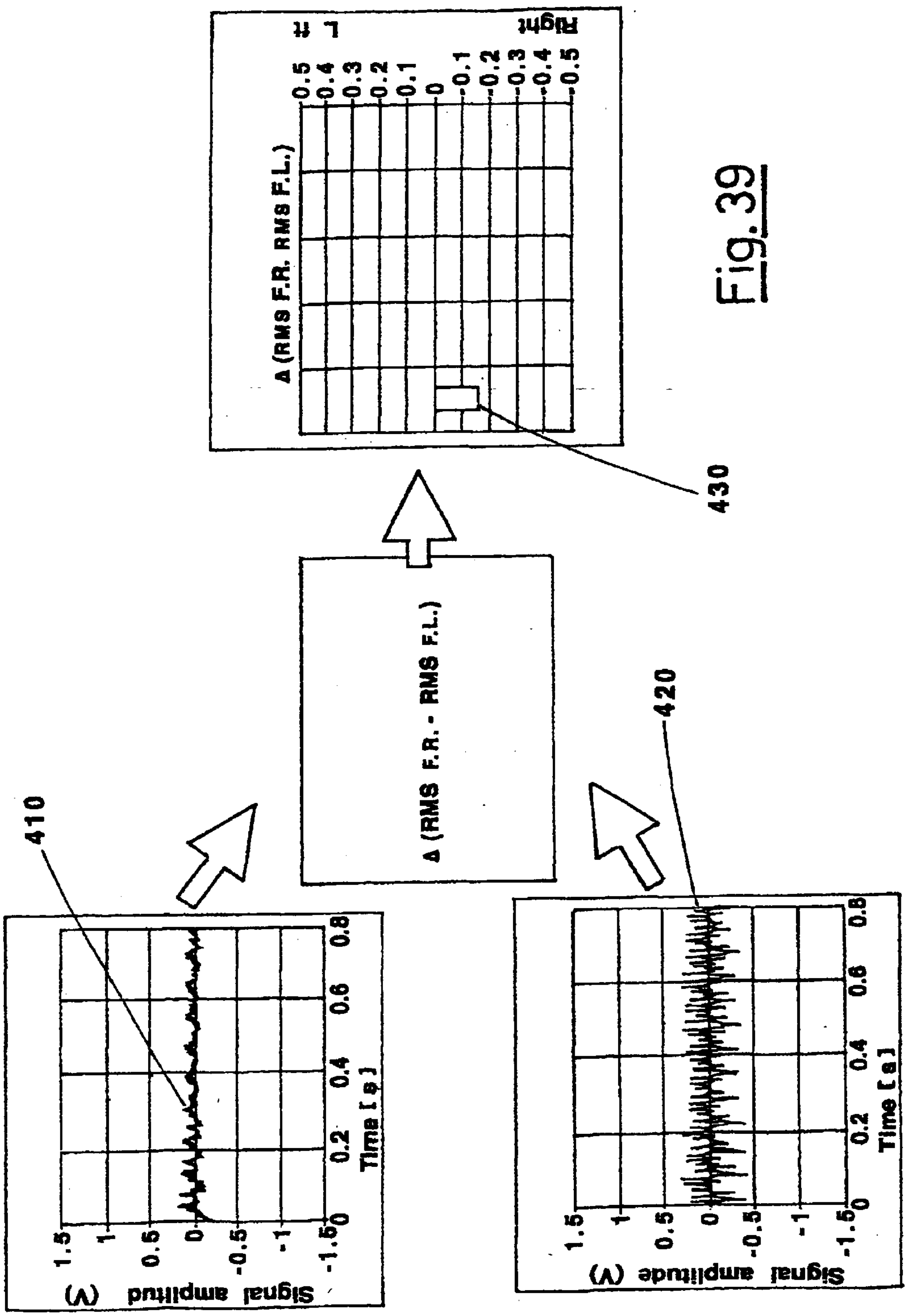
FIGS. 39 and 40 show the calculation of the index of transfer of load in two separate cases.
Figure 40:
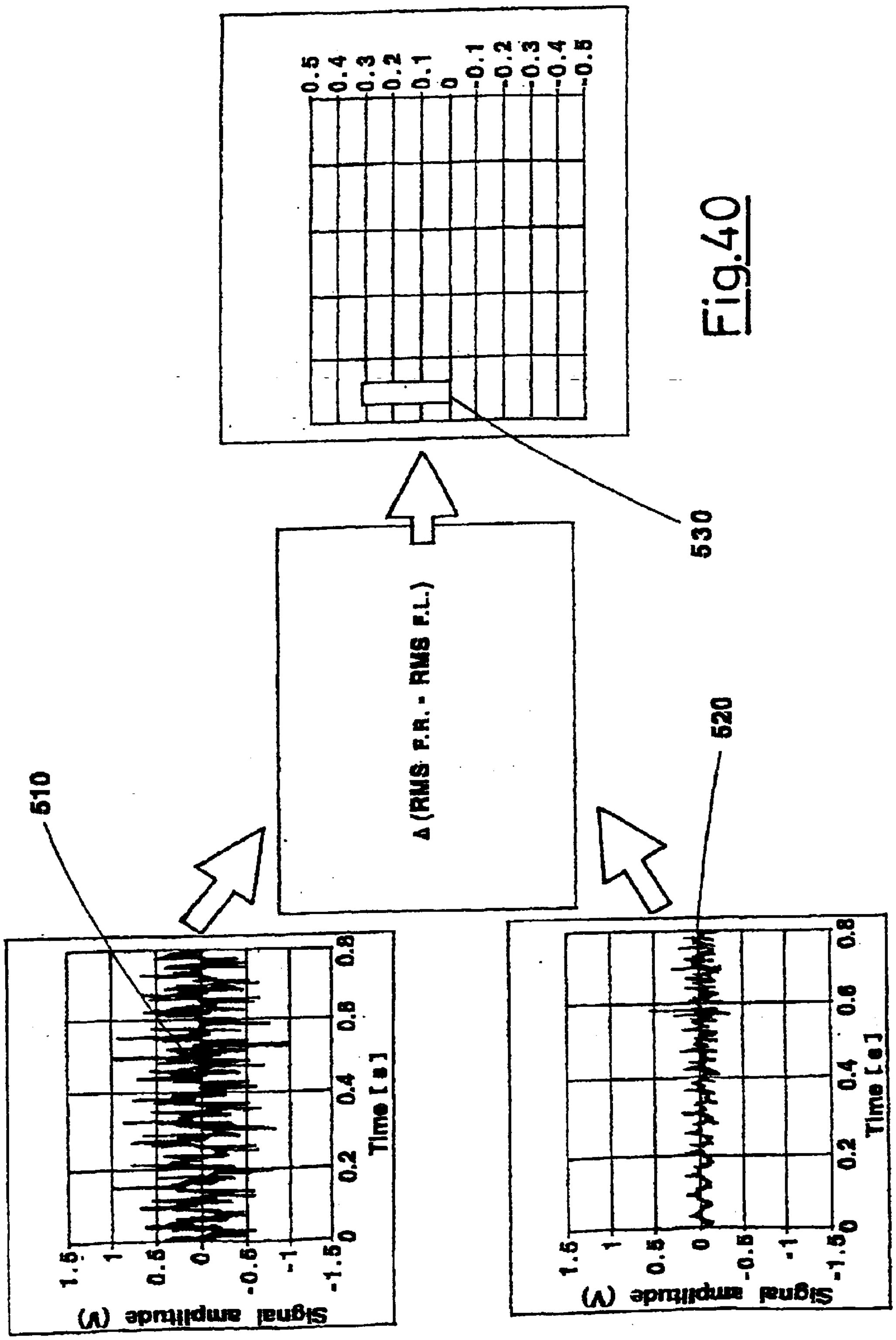

FIGS. 39 and 40 show the sequence of operations necessary to calculate the index of transfer of load in the cases of a vehicle turning towards the right and towards the left, respectively.

In more detail, in accordance with the abovementioned variant of the invention, FIG. 39 shows the amplitude against time of the signals 410 and 420 coming from a front right tyre and front left tyre, respectively, moving at a speed of 110 km/h on a path curving towards the right. The signal 420, compared with the signal 410, exhibits a greater amplitude than the latter, demonstrating that when turning towards the right it is the front left tyre that comes under greatest stress.

FIG. 39 shows the value of the difference, obtained by the RMS calculation, between the signal coming from a sensor of the invention associated with the front right wheel, on the one hand, and that from a similar sensor associated with the front left wheel, on the other, and this corresponds to the index of the transfer of load associated with this event. In particular, if 100 is the optimal index of transfer of load, the reference index 430 shown in FIG. 39 is equal to 70.

In the same way as in FIG. 39, FIG. 40 shows the amplitude against time of the signals 510 and 520 coming from a sensor of the invention associated with the front right tyre, on the one hand, and from a similar sensor associated with the front left tyre, on the other, of the abovementioned vehicle travelling at a speed of 110 km/h on a path curving towards the left. In this case the signal 510, when compared with the signal 520, exhibits a greater amplitude than the latter, confirming that when turning left, the tyre under greatest stress is the front right tyre.

FIG. 40 shows the value of the difference, obtained by the RMS calculation, between the respective signals 510 and 520, which corresponds to the index of the transfer of load associated with this event. In particular, if 100 is the optimal index of transfer of load, the reference index 530 in FIG. 40 is equal to 50.

Example 12

Index Representing Stress from Torque

A signal from a sensor of the invention generated as the torque applied to a moving wheel varies exhibits sudden variations, in time, in the distance between the various distinctive elements of the signal, owing to the changing speed of the wheel as it goes through a series of longitudinal accelerations and decelerations of the vehicle. These accelerations and decelerations are troublesome for the driver of the vehicle and for any passengers.

Once again, in accordance with the present invention, by using the RMS calculation it is possible to obtain an index that describes the event (accelerations and decelerations in the longitudinal direction, i.e. along the x axis) which can be compared, if required, with a predetermined threshold index, as described above in relation to the other types of event.

What is claimed is:

1. A system for determining interaction between a tyre and a contact surface during movement of a motor vehicle, comprising:

at least one first sensor;

processing means;

wherein the at least one first sensor comprises one or more first elongated piezoelectric elements, wherein the one or more first elongated piezoelectric elements extend along at least a first portion of the tyre, wherein the at least one first sensor supplies a first signal to the processing means, wherein the first signal is generated by rotation of the tyre, wherein the first signal is generated cyclically with each revolution of the tyre, wherein the processing means detects variations in time intervals between distinctive elements of the first signal, and wherein the tyre comprises:

a casing;

a tread;

one or more belt plies;

sidewalls; and beads.

2. The system of claim 1, wherein the first signal is proportional to variations of deformation undergone by the at least one first sensor during the rotation of the tyre.

3. The system of claim 1, wherein the at least one first sensor is disposed along at least a portion of a predetermined circumference of the tyre.

4. The system of claim 3, wherein the predetermined circumference is an equatorial circumference.

5. The system of claim 1, wherein the at least one first sensor is disposed along a portion of a meridian profile of the tyre.

6. The system of claim 1, wherein the at least one first sensor is disposed on an inner surface of the casing.

7. The system of claim 1, wherein the at least one first sensor is embedded in the casing, in the tread, in the one or more belt plies, or in a bead.

8. The system of claim 1, wherein the system further comprises at least one second sensor, comprising:

a second elongated piezoelectric element;

wherein the second elongated piezoelectric element extends along at least a second portion of the tyre, wherein the second sensor supplies a second signal to the processing means, wherein the second signal is generated by rotation of the tyre, wherein the second signal is generated cyclically with each revolution of the tyre, wherein the processing means detects variations in time intervals between distinctive elements of the second signal.

9. The system of claim 8, wherein the second signal is proportional to variations of deformation undergone by the second sensor during the rotation of the tyre.

10. The system of claim 8, wherein the second sensor is disposed along at least a portion of a circumference forming part of one of the beads.

11. The system of claim 8, wherein the second sensor is disposed along a bead portion of a meridian profile of the tyre.

12. The system of claim 1, wherein the at least one first sensor and the second sensor are coaxial piezoelectric cables.

13. The system of claim 12, wherein the coaxial piezoelectric cables comprise:

a central core;

an insulating layer;

a mesh wrapping; and a sheath;

wherein the central core comprises a first electrically-conducting material, wherein the insulating layer comprises a piezoelectric polymer, and wherein the mesh wrapping comprises a second electrically-conducting material.

14. The system of claim 1, wherein the at least one first sensor comprises a cable, comprising:

piezoelectric portions; and non-piezoelectric, electrically-conducting portions;

wherein the piezoelectric portions are electrically connected to the non-piezoelectric portions.

15. The system of claim 14, wherein the piezoelectric portions and the non-piezoelectric portions are electrically-connected in an alternating sequence.

16. The system of claim 15, wherein the piezoelectric portions and the non-piezoelectric portions comprise a zigzag configuration.

17. The system of claim 15, wherein the piezoelectric portions and the non-piezoelectric portions are aligned.

18. The system of claim 15, wherein the cable comprises:

a central conducting core;

tubular portions of piezoelectric insulating material;

tubular portions of non-piezoelectric insulating material;

an electrically-conducting mesh wrapping; and a sheath;

wherein the tubular portions of piezoelectric insulating material and tubular portions of non-piezoelectric insulating material are disposed around the core in an alternating sequence.

19. The system of claim 1, wherein the at least one first sensor is disposed in an annular groove recessed into a shoulder of a rim of the tyre, and wherein the at least one first sensor remains in contact with an outer surface of a respective bead.

20. The system of claim 19, wherein the at least one first sensor is disposed in a shoulder of a rim of the tyre, wherein the at least one first sensor comprises sections sensitive to deformation of a respective bead, wherein the sensitive sections are disposed on an inner side of the shoulder of the rim, wherein the at least one first sensor comprises sections not sensitive to deformation of the respective bead, wherein the non-sensitive sections are disposed on an outer side of the shoulder of the rim, and wherein the sensitive and non-sensitive sections are disposed in an alternating sequence.

21. The system of claim 20, wherein a radio signal transmitter is disposed on the shoulder of the rim.

22. A system for continuous determination of interactions between a tyre and a contact surface during movement of a motor vehicle, comprising:

a tyre;

at least one sensor; and processing means;

wherein the at least one sensor comprises one or more elongated piezoelectric elements, wherein the one or more elongated piezoelectric elements extend along at least a portion of the tyre, wherein the at least one sensor supplies a signal to the processing means, wherein the signal is generated by rotation of the tyre, wherein the signal is generated cyclically with each revolution of the tyre, wherein the processing means detects variations in time intervals between distinctive elements of the signal.

* * * * *